(12) United States Patent (10) Patent No.: US 7,694,087 B2
Soeda (45) Date of Patent: Apr. 6, 2010

(54) DUPLICATE DATA STORING SYSTEM, DUPLICATE DATA STORING METHOD, AND DUPLICATE DATA STORING PROGRAM FOR STORAGE DEVICE

(75) Inventor: Naoki Soeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1163 days.

(21) Appl. No.: 11/038,258

(22) Filed: Jan. 21, 2005

(65) Prior Publication Data

US 2005/0163014 A1 Jul. 28, 2005

(30) Foreign Application Priority Data

Jan. 23, 2004 (JP) ............................. 2004-015016

(51) Int. Cl.
*G06F 12/16* (2006.01)

(52) U.S. Cl. ...................... 711/162; 707/102; 711/161; 714/5; 714/6

(58) Field of Classification Search ................. 707/102; 711/161, 162; 714/5, 6
See application file for complete search history.

(56) References Cited

U.S. PATENT DOCUMENTS 5,930,828 A * 7/1999 Jensen et al. ................ 711/170

| | | | |
|---|---|---|---|
| 6,584,551 | B1 * | 6/2003 | Huber ......................... 711/162 |
| 2003/0131207 | A1 * | 7/2003 | Arakawa et al. ............. 711/162 |
| 2003/0158834 | A1 * | 8/2003 | Sawdon et al. ................. 707/1 |

FOREIGN PATENT DOCUMENTS

| | | |
|---|---|---|
| JP | 03070047 | 3/1991 |
| JP | 2000020367 | 1/2000 |
| JP | 2001-051882 A | 2/2001 |
| JP | 2001265626 | 9/2001 |
| JP | 2001-318833 A | 11/2001 |
| JP | 2002108673 | 4/2002 |
| JP | 2002229741 | 8/2002 |

* cited by examiner

*Primary Examiner*—Sanjiv Shah
*Assistant Examiner*—Jae U Yu
(74) *Attorney, Agent, or Firm*—Sughrue Mion, PLLC

(57) ABSTRACT

Provided is a data storing system which holds only updated data by a snapshot action of a disk array subsystem. When there is generated a writing request to snapshot duplicate volumes as the duplicate data storing areas, unused pages for the requested amount is searched from a common logical-volume which is used in common as a real data storage area within the disk array subsystem, and address conversion of the page is performed. The result of the address conversion is held in a directory which is provided for each of the snapshot duplicate volumes. When making an access to the page thereinafter, the directory is always being referred to, and the address conversion is performed from the page of the snapshot duplicate volumes to the corresponding page of the common logical-volume.

27 Claims, 35 Drawing Sheets

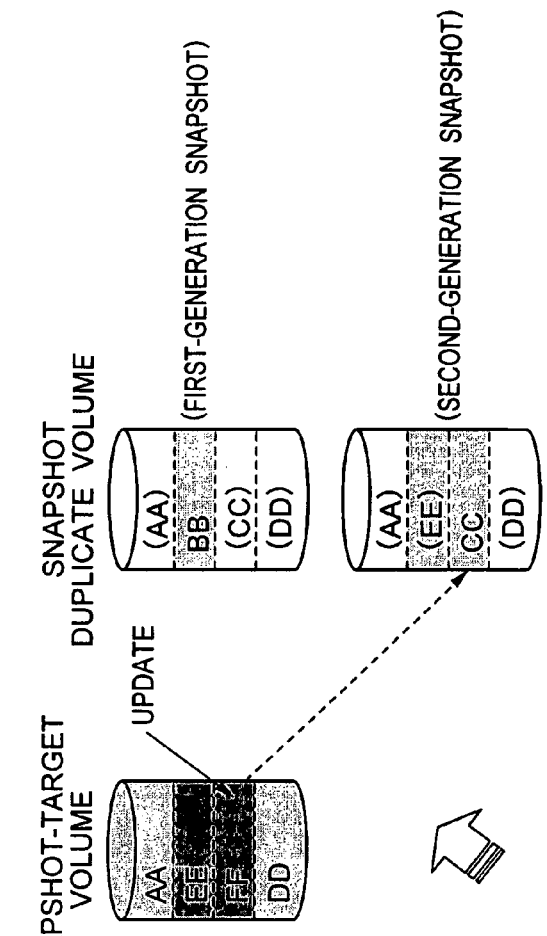
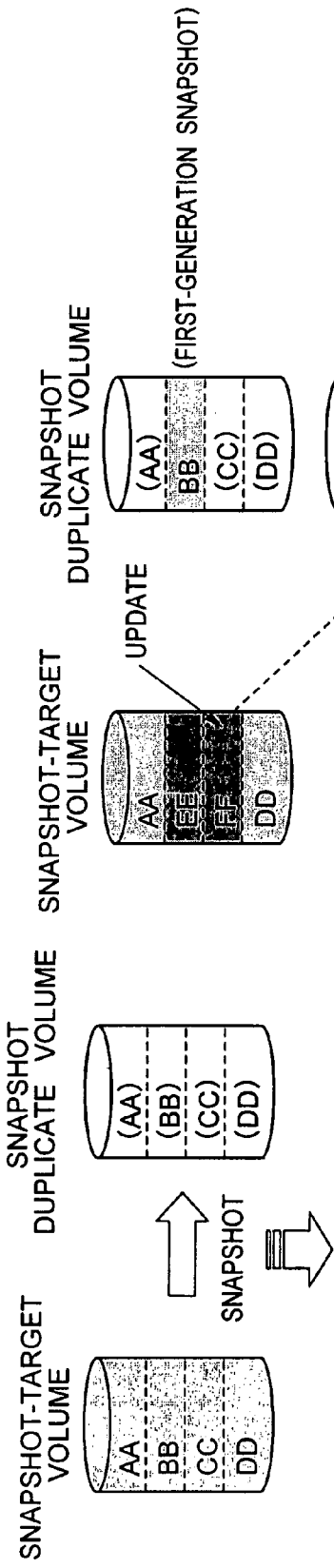
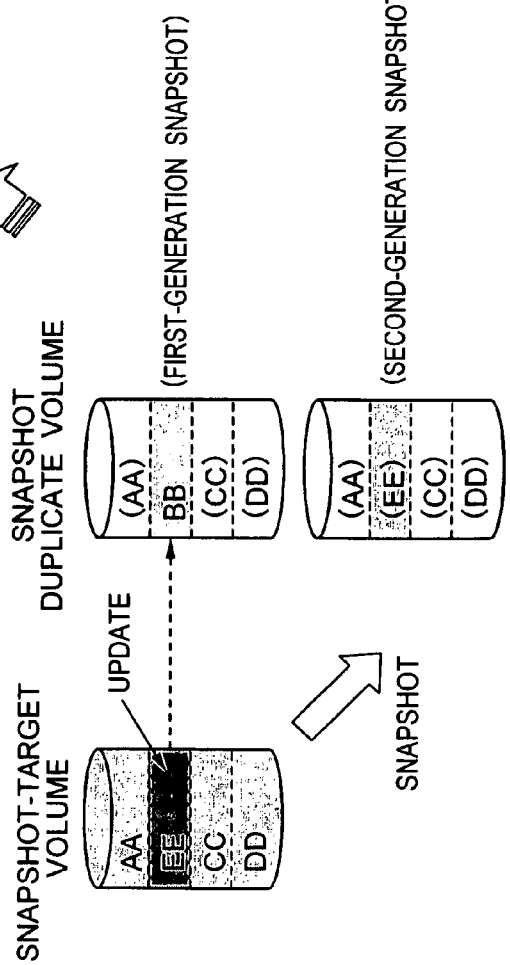

DUPLICATE DATA STORING SYSTEM, DUPLICATE DATA STORING METHOD, AND DUPLICATE DATA STORING PROGRAM FOR STORAGE DEVICE

BACKGROUND OF THE INVENTION

1. Field of the Invention

The present invention relates to storing data into a storage device of a disk array subsystem and the like and, especially, to a duplicate data storing system, a duplicate data storing method, and a duplicate data storing program, which enable to improve an effective usage of the storage device capacity in a duplicate data storage area at the time of using snapshot technique while maintaining the disk-access performance.

2. Description of the Related Art

When backing up the volume which constitutes a duplicate data storage area in a storage device of a disk array subsystem and the like, the volume as a backup target is duplicated inside the disk array subsystem and a backup server stores data read out from the duplicate data storage area to be the duplicate volume to a backup medium such as a tape drive.

As the method for duplicating the volume, conventionally used is a method in which a complete duplicate of the backup target volume is formed. Naturally, in this case, it takes time which is proportional to the storage capacity of the volume of the backup target for completing the duplication of the volume.

For increasing the use efficiency of the backup-target volume, Japanese Patent Unexamined Publication No. 2001-318833 discloses a technique in which a plurality of volumes are used around so as to select a duplicate volume appropriate for the capacity of the backup-target volume. This technique does not enable to shorten the time used for duplicating the volume. Also, it is necessary to reserve a plurality of the duplicate volumes for functioning as the duplicate data storage areas in advance to be used for backup, which causes such a shortcoming that the required storage capacity becomes redundant.

Recently, in accordance with a remarkably increasing trend of reduction in backup window (system suspension time for backup processing), a technique such as snapshot or shadow copy has been put in use for duplicating the volume.

The snapshot herein is a technique for maintaining the state of the volume as the snapshot-target volume at the time when being designated. For example, if a snapshot of the snapshot-target volume as shown in FIG. 1(a) in which data is stored is taken, first, a snapshot duplicate volume having a storage capacity equivalent to that of the snapshot-target volume is generated in a storage device in the manner as shown in FIG. 1(a).

At a stage of writing data "EE" to a storage area of data "BB" of the snapshot-target volume, the data "BB" before update is stored in the same address of the snapshot duplicate volume in the manner as shown in FIG. 1(b), and the snapshot duplicate volume functions as a first-generation snapshot.

At this time, if another snapshot of the snapshot-target volume is taken once again, a snapshot duplicate volume having the storage capacity equivalent to that of the snapshot-target volume is newly generated in the storage device in the manner as shown in FIG. 1(b), and the snapshot duplicate volume functions as a second-generation snapshot.

Further, if it is desired to write data "FF" in a storage area of data "CC" of the snapshot-target volume, the data "CC" before update is stored in the same address of the snapshot duplicate volume which functions as a second-generation snapshot in the manner as shown in FIG. 1(c), while the content of the snapshot duplicate volume which functions as the first-generation snapshot is being held as shown in FIG. 1(b) or FIG. 1(c).

Here, a series-type snapshot has been briefly described by referring to FIG. 1(a) to FIG. 1(c). In the case where a parallel-type snapshot is applied, when writing the data "FF" in the storage area of the data "CC" of the snapshot-target volume in the manner as shown in FIG. 1(c), the data "CC" is stored also in the first-generation snapshot in addition to the second-generation snapshot.

In the volume duplicating method utilizing the snapshot technique, it may simply define the volume for holding only the update data to the backup-target volume right after the disk array subsystem receives a snapshot command. Thus, the backup-target volume can be seemingly duplicated at instant. Hereinafter, in the backup of the volume using the snapshot technique, the volume for storing an original data as the backup target is referred to as the snapshot-target volume, and the volume to be the duplicate data storage area for holding the update data of the backup-target volume is referred to as the snapshot duplicate volume, respectively.

The use of the snapshot technique in the backup processing is only an example, and the snapshot technique is utilized in other various situations in the operation of the disk array subsystem.

An example of a conventional data storing system for the snapshot duplicate volume using the snapshot technique will be specifically described by referring to FIG. 2 to FIG. 9.

A conventional disk array subsystem 100 comprises: a device (logical-volume property managing table, 201 in FIG. 3) for judging by each logical-volume whether the logical-volume is the snapshot-target volume, the snapshot duplicate volume, or a volume of any other property; a device (logical-volume conversion table, 202 in FIG. 3) for address-converting a read-command or write-command which is issued by a host by designating the logical-volume into another logical-volume as the inner operation; and a device (held-data managing table, 203 in FIG. 3) for judging whether or not the snapshot duplicate volume holds the data required by the read-command or the write-command.

The data held in the snapshot duplicate volume is managed in a size peculiar to the disk array subsystem 100, so that the read-command or the write-command from the host is divided into the peculiar management units described above by an IO monitoring device (400 in FIG. 7) to be processed by each management unit.

FIG. 4, FIG. 5, and FIG. 6 illustrate the process of forming the duplicate of the volume and performing reading or writing from/to the volume in the disk array subsystem 100 employing the above-described data storing system.

As the process for duplicating the volume, first, as shown in FIG. 4, the snapshot-target volume and the snapshot duplicate volume having at least the same storage capacity as that of the snapshot-target volume are formed within the disk array subsystem in a step 3a00.

FIG. 2 shows the state of this process. In this example, two logical-volumes, that is, a logical-volume LV0 and a logical-volume LV1 are formed in the disk array subsystem 100.

When the disk array subsystem receives a snapshot command having a parameter which indicates that the logical-volume LV0 is the snapshot-target volume and the logical-volume LV1 is the snapshot duplicate volume in a next step 3a01, the logical-volume property managing table 201, the logical-volume conversion table 202, and the held-data managing table 203 are initialized in a step 3a02.

That is, the snapshot-target property is given to the logical-volume LV0 and the snapshot-duplicate property to the logical-volume LV1 in the logical-volume property managing table 201. In the logical-volume conversion table 202, LV1 is set as a logical-volume number after conversion corresponding to the logical-volume LV0, LV0 is set as a logical-volume number after conversion corresponding to the logical-volume LV1, and a value 0 indicating that the snapshot duplicate volume holds no data is set in the snapshot duplicate volume (that is, the logical-volume LV in this case) in the held-data managing table 203. The state of each table at this time is shown in FIG. 3.

Next, described is a procedure of the processing performed at the time when the disk array subsystem 100 having the snapshot-target volume LV0 and the snapshot duplicate volume LV1 as described in the aforementioned procedure of volume duplicate receives the write-command and read-command.

First, described is the processing process at the time of receiving the write-command (505 in FIG. 8).

A microprocessor (simply referred to as CPU hereinafter) of the disk array subsystem 100 refers to the logical-volume property managing table 201 in a step 3b00 shown in FIG. 5 for judging whether the received command is a command for the snapshot-target volume or for the snapshot duplicate volume.

The processing is completed without writing data when it is judged to be the write-command to the snapshot duplicate command in a step 3b01. This is the processing of the case where it is used to maintain the duplicate of the snapshot-target volume in the state of the point where the snapshot command is received in the snapshot duplicate volume, e.g., the processing for backup and the like. In other use data may be written onto the snapshot duplicate volume as requested by the write-command.

In the meantime, when it is judged to be the write-command for the snapshot-target volume in a step 3b01, the CPU refers to the logical-volume conversion table 202 in a step 3b02 and specifies the snapshot duplicate volume as a pair of the snapshot-target volume. In a step 3b03, it is judged from the held-data managing table 203 whether there is data in the write-request address of the specified snapshot duplicate volume. When it is judged that the there is the data in the snapshot duplicate volume LV1, the data is written to the snapshot-target volume LV0 in a step 3b07 and the processing is completed. When it is judged that there is no data in the snapshot-target volume LV1, the data already stored in the write-request address of the snapshot-target volume LV0 is copied to the same address of the snapshot duplicate volume LV1 in a step 3b05. Then, a value 1 indicating that there is data in this area of the held-data managing table 203 is set in a step 3b06, and the data is written to the snapshot-target volume LV0 in a step 3b07. Thereby, the processing is completed.

Next, described is a procedure of the processing performed at the time of receiving the read-command (506 in FIG. 8). The CPU refers to the logical-volume property managing table 201 in a step 3c00 shown in FIG. 6 for judging whether the received command is a command for the snapshot-target volume LV0 or a command for the snapshot duplicate volume LV1.

When it is judged to be a command for the snapshot-target volume LV0 in a step 3c01, the data is read out from the snapshot-target volume LV0, and the processing is completed.

In the meantime, when it is judged to be a command for the snapshot duplicate volume LV1 in a step 3c01, reference is made to the held-data managing table 203 in a step 3c02, and it is judged in a step 3c03 whether or not there is data in a read-out require address of the snapshot duplicate volume LV1.

When it is judged that there is data in the snapshot duplicate volume LV1, the data is read out from the snapshot duplicate volume LV1 and the processing is completed. When it is judged that there is no data in the snapshot duplicate volume LV1, reference is made to the logical-volume conversion table 202 in a step 3c04 and recognizes the snapshot-target volume LV0 as a pair of the snapshot duplicate volume LV1. Then, the data is read out from the specified snapshot-target volume LV0 and the processing is completed.

A first drawback of the above-described conventional art is that the use efficiency of the storage capacity is bad.

The reason is that it is necessary in the data storing system of the snapshot duplicate volume in the conventional disk array subsystem to make a snapshot duplicate volume having at least the same storage capacity as that of the snapshot-target volume in spite that only the update data of the snapshot-target volume generated after receiving the snapshot command is copied to the snapshot duplicate volume.

That is, in the above-described conventional art, data-copy from the snapshot-target volume to the snapshot duplicate volume has to be performed by the same address so that, logically, the snapshot duplicate volume is limited to be in the same configuration as that of the snapshot-target volume.

A second drawback is that the data reading-out efficiency from the snapshot duplicate volume is bad.

The reason is that, in the data storing system of the snapshot duplicate volume in the conventional disk array subsystem, the data-copy from the snapshot-target volume to the snapshot duplicate volume is symmetrically performed in between the volumes having logically the same configuration with the same address being the parameter.

Accordingly, when the data-copy from the snapshot-target volume to the snapshot duplicate volume is generated in the scattered addresses, naturally, the data held in the snapshot duplicate volume becomes the scattered data. Thus, the effect of pre-fetching from a physical disk cannot be expected at all.

An object of the present invention is to provide a duplicate data storing system, a duplicate data storing method, and a duplicate data storing program for enabling to form a duplicate volume which consumes a storage capacity proportional to an update data amount of a snapshot-target volume after receiving a snapshot command in a storage device such as a disk array subsystem.

SUMMARY OF THE INVENTION

The duplicate data storing system of the storage device according to the present invention achieved the above-described object through a feature which comprises a real data storage area for storing data to be written to a duplicate data storage area which is virtually built within the storage device; a data-storage area determining device for determining a next storage area to be used in a contiguous arrangement in the real data storage area; and a data-storage area managing device for managing stored areas of data in the duplicate data storage area within the real data storage area.

With the above-described configuration, the data to be written to the duplicate data storage area within the storage device at the time of updating the original data are all stored in the real data storage area. The storage capacity required for the real data storage area is the amount corresponding to the data amount to be actually updated. Thus, the storage capacity of the real data storage area which functions as a substantial duplicate volume can be largely reduced compared to the conventional duplicate volume which requires the storage capacity equivalent to that of the volume for storing the original data.

In other words, the duplicate data storage area of the present invention is only the area virtually built in the storage device and, substantially, it is formed by a data storage area managing device which manages where, in the real data storage areas, the data to be written to the duplicate data storage area is stored. The data storage area managing device is a kind of index table so that the storage capacity required for building the data storage area managing device is extremely small.

The above-described configuration contains additionally a data-storage area determining device for determining a next storage area to be used in a contiguous arrangement in the real data storage area.

When the data is written to the real data storage area, the data storage area determining device determines the next storage area to be used in a contiguous arrangement for storing the data in order. Therefore, there is no vacant area to be formed carelessly in the real data storage area so that the storage capacity of the real data storage area can be saved and the data reading-out efficiency from the duplicate volume by pre-fetch can be improved.

In addition to the above-described configuration, it is possible to provide a held-data managing device for managing a use state of the real data storage area and a real data storage area expanding device for increasing a storage capacity of the real data storage area.

The use state of the real data storage area is managed by the held-data managing device and the storage capacity of the real data storage area can be increased by the real data storage area expanding device as necessary. Therefore, it is possible to surely store the data in the real data storage area even though the initial capacity of the real data storage area is set relatively small.

More specifically, as the real data storage area expanding device, it is possible to employ a configuration in which the real data storage area itself is expanded for increasing the storage capacity.

Such configuration is effective in the case where there are contiguous unused storage areas present in the real data storage area within the storage device.

Further, the real data storage area expanding device may be so constituted to generate a new real data storage area within the storage device in addition to the real data storage area which has already been provided.

In the case of employing such configuration, it is possible to increase the storage capacity of the real data storage area by additionally forming a new real data storage area in the unused storage area even when there is not a sufficient contiguous unused storage area present in the real data storage area, as long as there is a reasonable unused storage area present within the storage device.

Here, one or more of the real data storage areas may be provided for storing data in all the duplicate data storage areas within the storage device to the one or more of the real data storage area.

As described above, the data storage area managing device clearly specifies the correlation which indicates where the data to be written to the duplicate data storage area is stored in the real data storage area. Therefore, even there are a plurality of duplicate data storage areas and real data storage areas present within the storage device, there is no specific drawback to be caused in storing data and in specifying the storage areas and it enables to precisely correspond to the system with various volume structures.

For example, by dividing the duplicate data storage area within the storage device into a plurality of groups; providing one or more of the real data storage areas for each of the groups; and, further, providing a device having a list of the duplicate data storage areas and the real data storage areas belonging to the groups to each of the groups, it is possible to store data of the duplicate data storage area within the group in the one or more of the real data storage areas within the group.

In the case where such configuration is employed, the device for holding a list of the duplicate data storage areas and the real data storage areas functions as a part of the above-described data storage area managing device, which enables to precisely manage where the data to be written to the duplicate data storage area is written in the real data storage area in regards to the correlation between a plurality of the duplicate data storage areas and a plurality of the real data storage areas. It is possible that the required capacity of the real data storage area as the entire duplicate data storage areas which are put into a group can be estimated in advance. Thus, in the case where there is an upper limit in the storage capacity of a physical recording medium to which the real data storage area is provided, it is possible to effectively utilize the physical recording media such as hard disks and the like through optimizing a combination of the duplicate data storage areas as one group, or optimizing the number or the combination of the real data storage areas or the physical recording media corresponding to the group.

It may comprise an alarm generating device for generating an alarm which encourages an increase of the real data storage area when a used storage capacity of the real data storage area exceeds an alarm generating threshold value by setting the alarm generating threshold value for the real data storage area.

In the case where such configuration is employed, an alarm is generated before there is a shortage of the capacity generated in the real data storage area. Thus, by actuating the real data storage area expanding device at this point, a shortage of the capacity in the real data storage area can be prevented beforehand.

More specifically, it is desirable to be in a configuration in which the real data storage area expanding device is actuated by an inside processing of the storage device by detecting the alarm from the alarm generating device.

By employing such configuration, the data storage area expanding device operates when the used storage capacity of the real data storage area exceeds the alarm generating threshold value and the real data storage area is automatically increased. Therefore, it is possible to surely prevent the shortage of the capacity in the real data storage area. Further, at the stage of storing the data in the real data storage area, it is always guaranteed that there is a sufficient storage capacity in the real data storage area, so that it is possible to write the data in the real data storage area immediately. Thus, it enables to overcome shortcomings such as a decrease in the processing speed due to the waiting time generated in accordance with expansion or generation of the real data storage area and so on.

Specifically, as for the above-described held-data managing device, the main part can be formed by a table which indicates the presence of data by each memory unit being obtained by dividing the storage area of the real data storage area.

The held-data managing device may simply indicate only the presence of the data so that the required minimum memory unit may be 1 bit, for example. Thus, there is no shortcoming such as waste of the storage capacity and so on caused by providing the held-data managing device. Further, time required for referring to the held-data managing device is very short so that there is almost no bad effect such as delay in the inside processing being caused by referring to the table.

The held-data managing device may be formed by: a table for indicating presence of data by each of the memory units which are obtained by dividing the storage area of the real data storage area; a table for indicating presence of data by a memory unit group in which a plurality of the memory units are put together; and a table with a plurality of hierarchies in which a plurality of the memory unit groups are put together for indicating presence of data of each group.

There are various sizes of the data stored in the real data storage area, and for storing such data in the real data storage area, it may be necessary to divide the data under various conditions. Specifically, for example, there are concepts such as the minimum memory unit (page) determined according to the structure or format of the physical recording medium to which the real data storage area is provided and a memory unit group (segment) in which a plurality of memory units are put together. By utilizing the hierarchy table formed in accordance with the structure of such storage area as the held-data managing device, the time required for checking the presence of the data in the storage area of the real data storage area and, further, the time for required for reading/writing the data can be dramatically shortened. For example, in the case where contiguous data is stored over a plurality of pages, it is unnecessary to check the presence of data by each page but the presence of the data in the segment in which the pages are grouped into may be simply checked. Also, reading and writing of data can be achieved by a single access.

The data storage area managing device may be formed by mapping the storage area of the real data storage area on the duplicate data storage area side.

As described above, there is no physical limit in the relation between the real data storage area and the duplicate data storage area. However, when storing the data to the real data storage area, first, an access is made from the host side to the duplicate data storage area so that by mapping the data storing area managing device to be referred on the duplicate data storage area side, it is highly possible that the processing speed can be improved.

Specifically, the data storage area managing device is formed to include a table for mapping the storage area of the real data storage area on the duplicate data storage area side and to obtain an address conversion information for the real data storage area from an entry of the table.

The table is not for storing the real data but for storing only the address conversion information. Thus, like the above-described held-data managing device, shortcomings such as waste of the storage capacity and so on are not to be caused.

Inversely, it is possible to form the data storage area managing device by mapping the storage area of the duplicate data storage area on the real data storage area side.

In this case, the data storage area managing device is formed to include a table for mapping the storage area of the duplicate data storage area on the real data storage area side and to obtain address conversion information for the real data storage area from an entry of the table.

Further, it is possible to employ a configuration comprising a memory unit managing device for managing memory units set in the real data storage area, wherein the data storage area determining device comprises: a communication device for communicating with a corresponding storage area managing table which obtains the data section held by a duplicate data storage area; a communication device for communicating with an IO monitoring device which obtains an IO size of a read-command or write-command for the duplicate data storage area; and an unused area searching device for detecting an available memory unit in a real data storage area through searching the held-data managing device.

By employing such configuration, the data storage area determining device can obtain the IO size of the write-command from the IO monitoring device through the communication device, and also can check the memory unit which is set by the memory unit managing device. Therefore, based on the IO size as a unit of writing data and the memory unit of the storage area in the real data storage area, the available storage area in the real data storage area can be precisely detected by the unused area searching device for storing the data. Likewise, when reading out the data, the IO size of the read-command can be obtained from the IO monitoring device through the communication device. Accordingly, based on the IO size as a unit for reading the data or the memory unit, it is possible to precisely read out the data as a target of reading from the duplicate data storage area by referring to the corresponding storage area managing table.

Here, it is desirable that the unused area searching device be so constituted that an available storage unit is detected by selecting the real data storage area according to an IO size of a command for the duplicate data storage area.

In the case where a plurality of the real data storage areas with different memory units are used together, the available storage area is to be detected by selecting the real data storage area according to the IO size so that the storage capacity of the real data storage area can be most effectively utilized.

It is possible to form the memory unit managing device so as to manage the memory units set in each of the real data storage areas.

In the case where such configuration is employed, in the memory unit managing device, the memory unit used regularly in each of the real data storage areas is stored for the numbers of the real data storage areas. Accordingly, the data storage area determining device can store the data through precisely detecting the available storage area in the real data storage area by the unused area searching device, after selecting the real data storage area which fits the IO size based on the IO size as a unit of writing the data or the memory unit of each real data storage area. Therefore, it enables to achieve the effective use of the storage capacity of the real data storage area.

Also, it is possible to form the memory unit managing device so as to manage the memory units set in each area which is obtained by dividing the real data storage area.

In the case where such configuration is employed, in the memory unit managing device, several kinds of available memory units are to be stored in a single real data storage area. Accordingly, the data storage area determining device can store the data through precisely detecting the storage area having the memory unit corresponding to the IO size as a unit of writing data from the real data storage area by the unused area searching device. In this case, the size of the storage area in the real data storage area is not fixed but there area several kinds of sizes being mixed. Therefore, for storing the data, the storage area having the memory unit corresponding to the IO size is to be always selected so that it enables to achieve the effective use of the storage capacity of the real data storage area.

Further, in addition to each of the above-described configurations, it is possible to provide a data arranging device for rearranging data by each of the real data storage areas.

By employing such configuration, it is possible to achieve a more effective use of the storage capacity of the real data storage area by eliminating the fragmentation generated by deletion of the data and the like.

Further, it is desirable that the data arranging device be formed to rearrange data automatically when it is detected that the data sections held in the real data storage areas are non-contiguous.

It is possible to shorten the time required for rearranging the data by rearranging the data before a strong fragmentation is generated.

A duplicate data storing method of a storage device achieves the same above-described object by a configuration, comprising the steps of: determining a next storage area to be used in a contiguous arrangement within a real data storage area when duplicating data from a duplicate data storage area to the real data storage area which is for storing the data of the duplicate data storage area being virtually built within a storage device; and managing a correlation which indicates where, in the real data storage area, data of the duplicate data storage area is stored through storing it within the storage device.

With the above-described configuration, the data to be written to the duplicate data storage area within the storage device at the time of updating the original data are all stored in the real data storage area. The storage capacity required for the real data storage area is the amount corresponding to the data amount to be actually updated. Thus, the storage capacity of the real data storage area which functions as a substantial duplicate volume can be largely reduced compared to the conventional duplicate data storing method which requires a duplicate volume having the storage capacity equivalent to that of the volume for storing the original data.

The real data is not stored in the duplicate data storage area so that it is necessary to manage the correlation between the virtual duplicate data storage area and the real data storage area which is for storing the real data by storing the corresponding relation within the storage device. However, the storage capacity required for building the data storage area managing device is extremely small so that there is no waste of the storage capacity being caused.

Further, when the data is duplicated in the real data storage area, the data storage area determining device determines the next storage area to be used in a contiguous arrangement. Therefore, there is no vacant area to be generated carelessly in the real data storage area so that the storage capacity of the real data storage area can be saved and the data reading-out efficiency from the duplicate volume by pre-fetch can be improved.

Further, a storage capacity of the real data storage area may be increased when a used storage capacity exceeds a threshold value by monitoring the used storage capacity of the real data storage area.

It is possible to increase the storage capacity of the real data storage area as necessary by monitoring the use state of the real data storage area. Thus, it is possible to surely store the data in the real data storage area even through the initial capacity of the real data storage area is set relatively small.

It may be configured to rearrange the data within the real data storage area by detecting that data held in the real data storage area is non-contiguous.

It is possible to achieve a more effective use of the storage capacity of the real data storage area by eliminating the fragmentation generated by deletion of the data and the like.

A duplicate data storing program of the present invention is a duplicate data storing program for storing data of a duplicate data storage area which is virtually built within a storage device in a real data storage area within the storage device, which achieves the above-described same object by a configuration wherein: a microprocessor provided within the storage device is made to function as a data storage area determining device for determining a next storage area to be used in a contiguous arrangement in the real data storage area so as to store data in the real data storage area; and also is made to function as a data storage area managing device for managing where, in the real data storage area, data of the duplicate data storage area is stored.

The microprocessor provided within the storage device functions as the data storage area determining device and stores the data in order by determining the next storage area to be used in a contiguous arrangement when storing the data in the duplicate data storage area which is virtually built within the storage device to the real data storage area within the storage device.

Thus, the vacant areas are not to be formed carelessly in the real data storage area so that the storage capacity of the real data storage area can be saved. Thereby, the reading-out efficiency of data from the duplicate volume by pre-fetch can be improved. The storage capacity required for the real data storage area is the amount corresponding to the data amount to be actually updated. Thus, the storage capacity of the real data storage area which functions as a substantial duplicate volume can be largely reduced compared to the conventional duplicate volume which requires the storage capacity equivalent to that of the volume for storing the original data.

Further, the microprocessor provided within the storage device also functions as the data storage area managing device and manages where, in the real data storage area, the data to be written to the duplicate data storage area is stored. Since it is necessary for management, a kind of index table which forms the main part of the data storage area managing device is generated within the storage device. However, the storage capacity required for building the table is extremely small so that it is not a factor for disturbing the effective use of the storage capacity.

Further, it may be so formed that the microprocessor within the storage device is made to function as a real data storage area expanding device by the duplicate data storing program.

It is possible to increase the storage capacity of the real data storage area as necessary at the point where the used storage capacity exceeds the threshold value by monitoring the use state of the real data storage area. Thus, it is possible to surely store the data in the real data storage area even through the initial capacity of the real data storage area is set relatively small.

Further, it is possible that the microprocessor within the storage device is made to function as a data arranging device by the duplicate data storing program.

The data within the real data storage area is rearranged at the stage of detecting that the data section held in the data storage area is non-contiguous. Thus, it is possible to achieve a more effective use of the storage capacity of the real data storage area by eliminating the fragmentation generated by deletion of the data and the like.

In the present invention, only the data to be updated in the volume for storing the original data is to be stored in the real data storage area which substitutes the snapshot duplicate volume. Thus, compared to the conventional duplicate data storing system and the duplicate data storing method in which the data is stored by utilizing the duplicate volume having the storage capacity equivalent to the storage capacity of the volume to which the original data is stored, it is possible to dramatically reduce the storage capacity of the real data storage area which functions as a substantial duplicate volume.

Further, when writing the data to the real data storage area, the data storage area determining device determines the next storage area to be used in a contiguous arrangement for storing the data in order. Therefore, there is no vacant area to be formed carelessly in the real data storage area so that the storage capacity of the real data storage area can be saved and the data reading-out efficiency from the duplicate volume by pre-fetch can be improved.

Also, the data storage area managing device clearly specifies the correlation which indicates where the data to be written to the duplicate data storage area is stored in the real data storage area. Therefore, even there are a plurality of duplicate data storage areas and real data storage areas present within the storage device, there is no specific drawback to be caused in storing data and in specifying the storage area and it enables to precisely correspond to the system with various volume structures.

BRIEF DESCRIPTION OF THE DRAWINGS

FIG. 1 is a conceptual figure for showing the functional principle of a snapshot;

DESCRIPTION OF THE PREFERRED EMBODIMENTS

Next, an embodiment in which a duplicate data storing system, a duplicate data storing method, and a duplicate data storing program of the present invention are applied to a disk array subsystem as a storage device will be described in detail by referring to the accompanying drawings.

Figure 10:
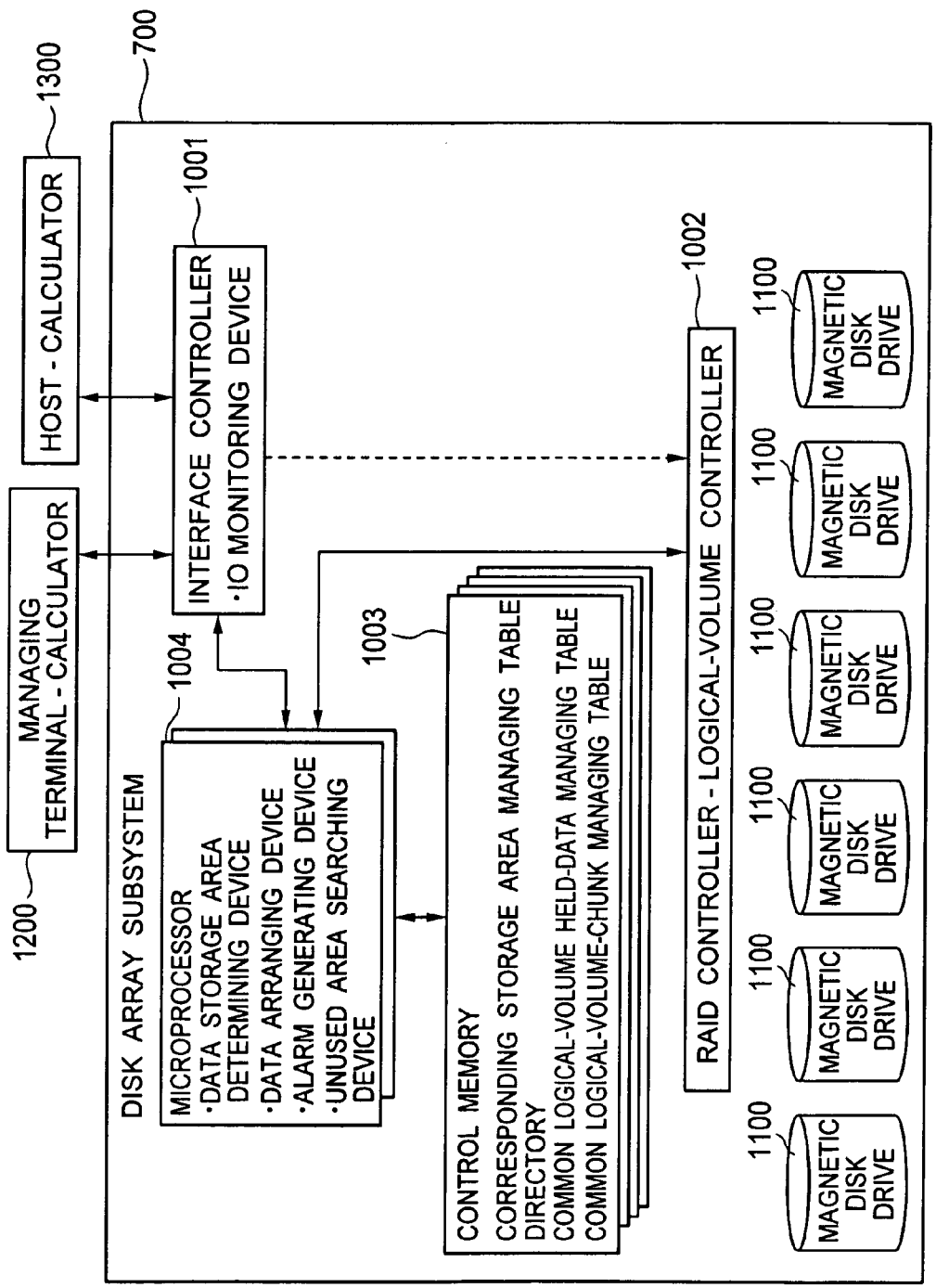
FIG. 10 is a functional block diagram for showing the schematic configuration of a disk array subsystem (First Embodiment)

FIG. 10 is a functional block diagram for showing a schematic configuration of a disk array subsystem 700 as hardware.

The disk array subsystem 700 is for performing processing such as backup of data through allotting a plurality of magnetic disk devices 1100 for a managing terminal 1200, a host computer 1300 and the like as superior devices. The disk array subsystem 700 comprises an interface controller 1001 used for being connected to the superior devices and a RAID controller 1002 for connecting each of the magnetic disk devices 1100. As for the interface controller 1001 and the RAID controller 1002, input/output of data is controlled by a microprocessor 1004 (simply referred to as CPU hereinafter) which operates according to a control program stored in a control memory 1003.

The CPU 1004 can be utilized as a various-function achieving device through rewriting the control program to be written onto the control memory 1003. Here, the CPU 1004 is utilized as: a data storage area determining device for determining a next storage area to be used when writing data to a real data storage area which is generated in the magnetic disk device 1100; a real data storage area expanding device for increasing a storage capacity of the real data storage area through expanding or adding the capacity; an alarm generating device for generating an alarm when the used storage capacity in the real data storage area exceeds an alarm generating threshold value; an unused area searching device for detecting an available memory unit in the real data storage area; and a data arranging device for rearranging the data by each of the real data storage areas, etc.

Further, the interface controller 1001 comprises an IO monitoring device which obtains the IO sizes of a read-command and a write-command for the magnetic disk device 1100 from the managing terminal 1200 and the host computer 1300.

FIG. 10 shows a case where six magnetic disk drives 1100 are connected. However, practically, each of the drives does not constitute logically independent volumes, such as the snapshot-target volume, the snapshot duplicate volume, or a common logical-volume or the like as a real data storage area, but it is possible to provide a seemingly single volume over a plurality of the magnetic disk drives 1100 and also possible to provide seemingly a plurality of volumes within a single magnetic disk drives 1100 by providing partitions in the single magnetic disk drives 1100.

Here, this type of seeming volume is referred to as a logical-volume.

First Embodiment

Figure 11:
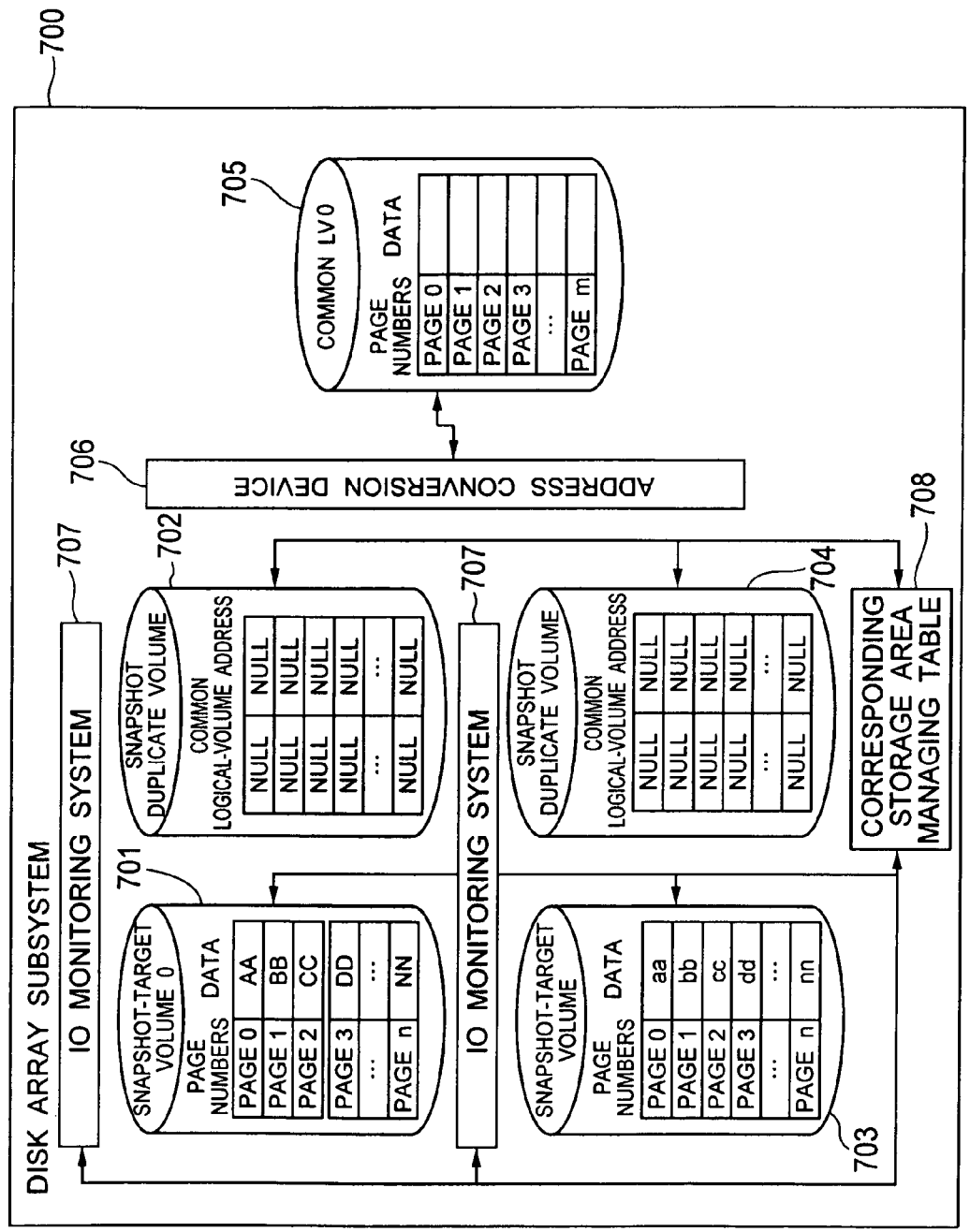
FIG. 11 is a functional block diagram for showing a specific example of the disk array subsystem of an embodiment to which the present invention is applied (First Embodiment)

FIG. 11 is a functional block diagram for simply illustrating a disk array subsystem 700 of a first embodiment from a functional point of view.

As shown in FIG. 11, schematically, the disk array subsystem 700 comprises: snapshot-target volumes 701, 703 to which original data is stored, snapshot duplicate volumes 702, 704 functioning as duplicate data storage areas; a corresponding storage area managing table 708 for managing the states of the snapshot-target volumes 701, 703 and the snapshot duplicate volumes 702, 704; a common logical-volume 705 functioning as a real data storage area which is an actual storage area of the duplicate data; an IO monitoring device 707 for controlling each unit by monitoring input/output data to/from the disk array subsystem 700; and an address conversion device 706 for managing mapping of data from the snapshot duplicate volumes 702, 704 to the common logical-volume 705.

There is no specific limit in the number of the snapshot-target volumes, the snapshot duplicate volumes, and the common logical-volumes. Here, there are two each of the snapshot-target volumes and the snapshot duplicate volumes and one common logical-volume provided as a mere example.

Figure 2:
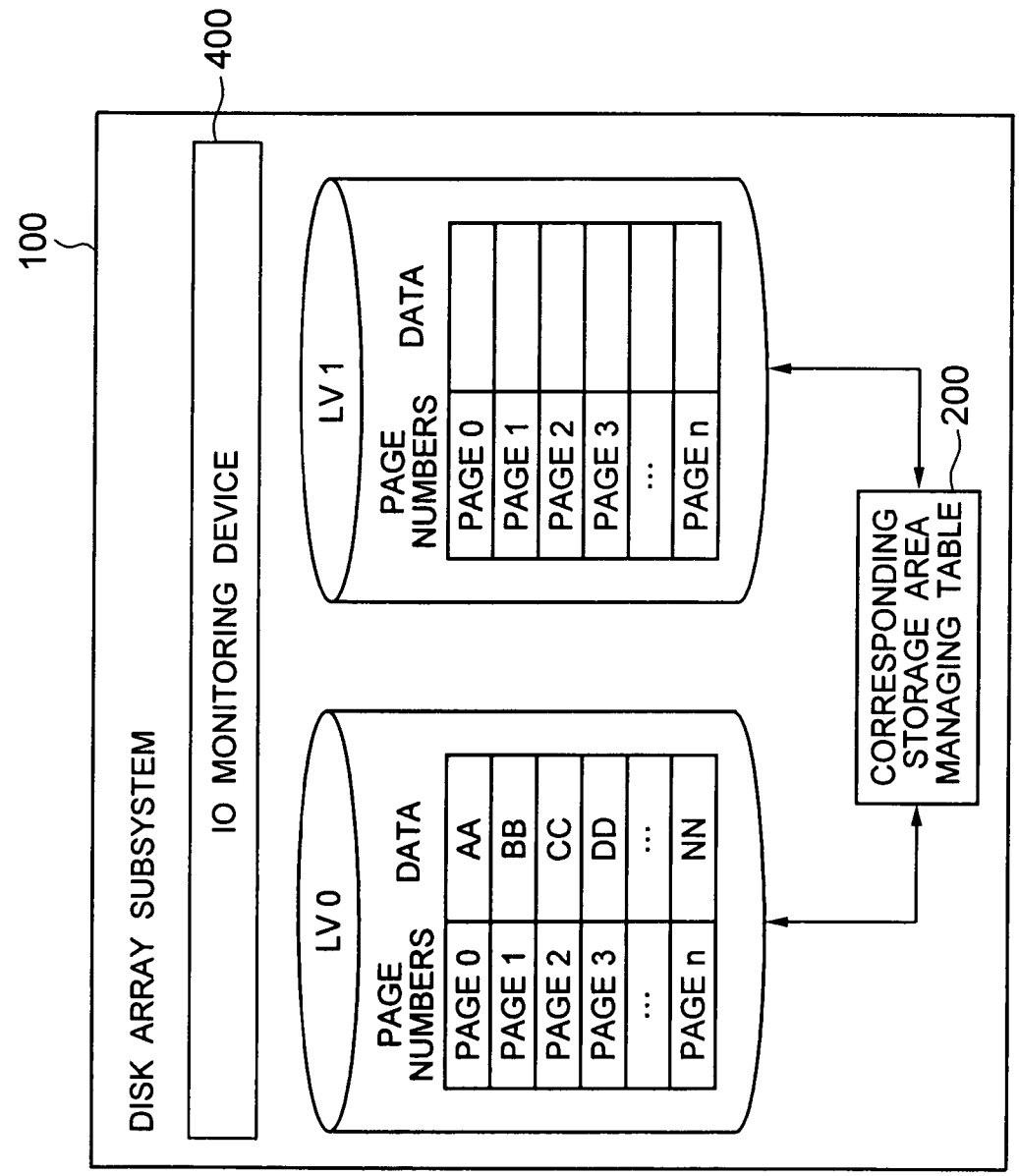
FIG. 2 is an illustration for showing a specific example of a conventional snapshot action (the state before writing is performed to a snapshot duplicate volume)
Figure 3:
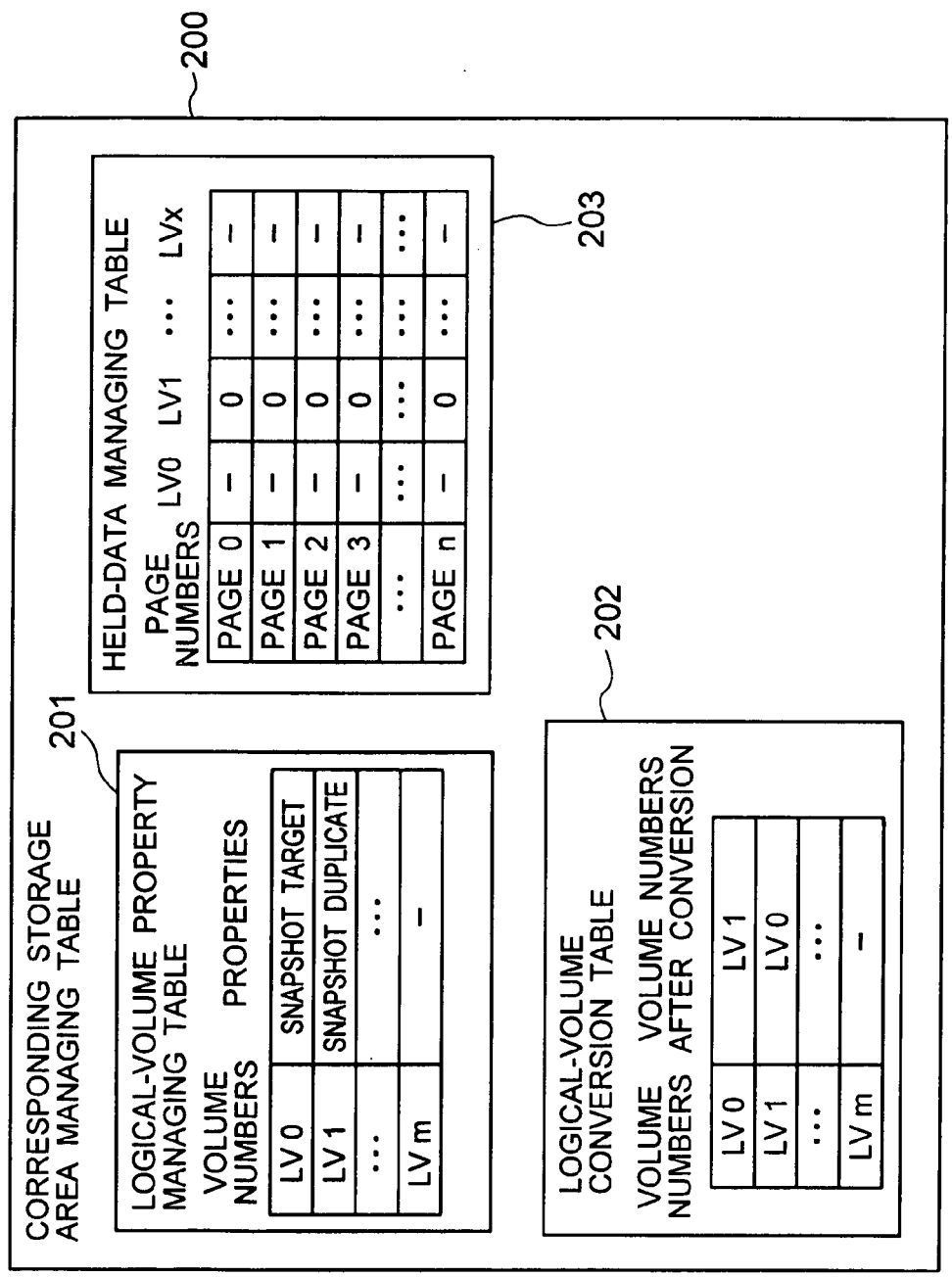
FIG. 3 is a conceptual figure for showing the state of a corresponding storage area managing table right after receiving a snapshot command in a conventional case.
Figure 4:
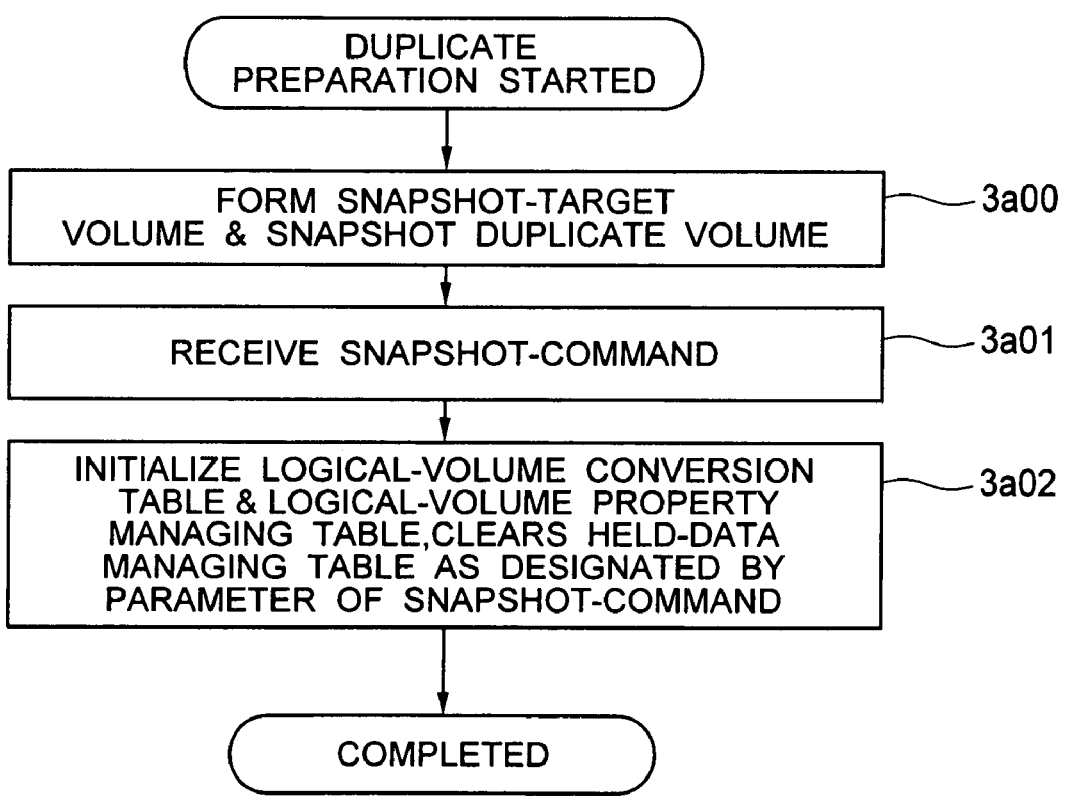
FIG. 4 is a flowchart for showing a preparation performed before the conventional snapshot action.
Figure 5:
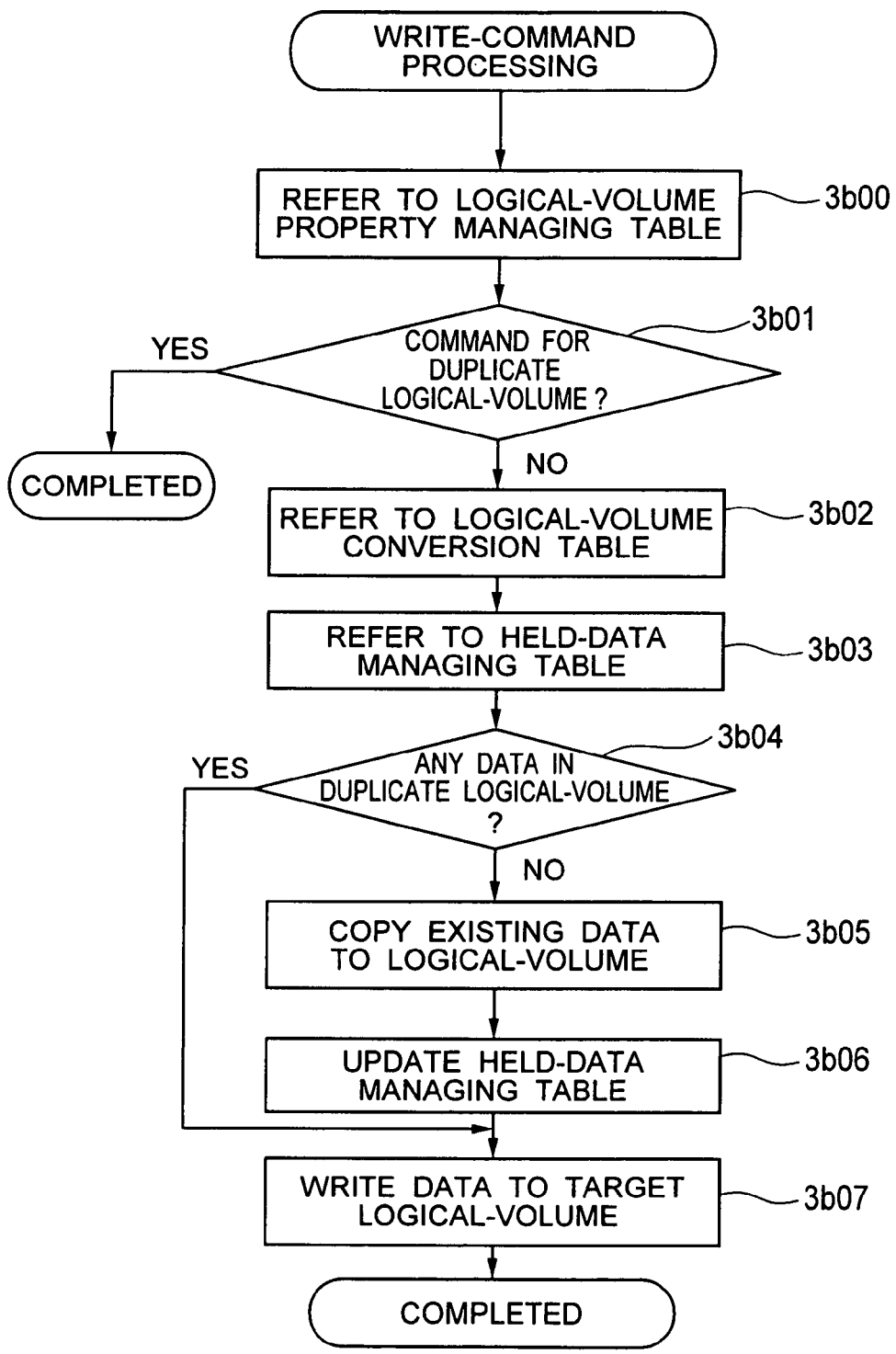
FIG. 5 is a flowchart for showing a write-command processing of the conventional snapshot action.
Figure 6:
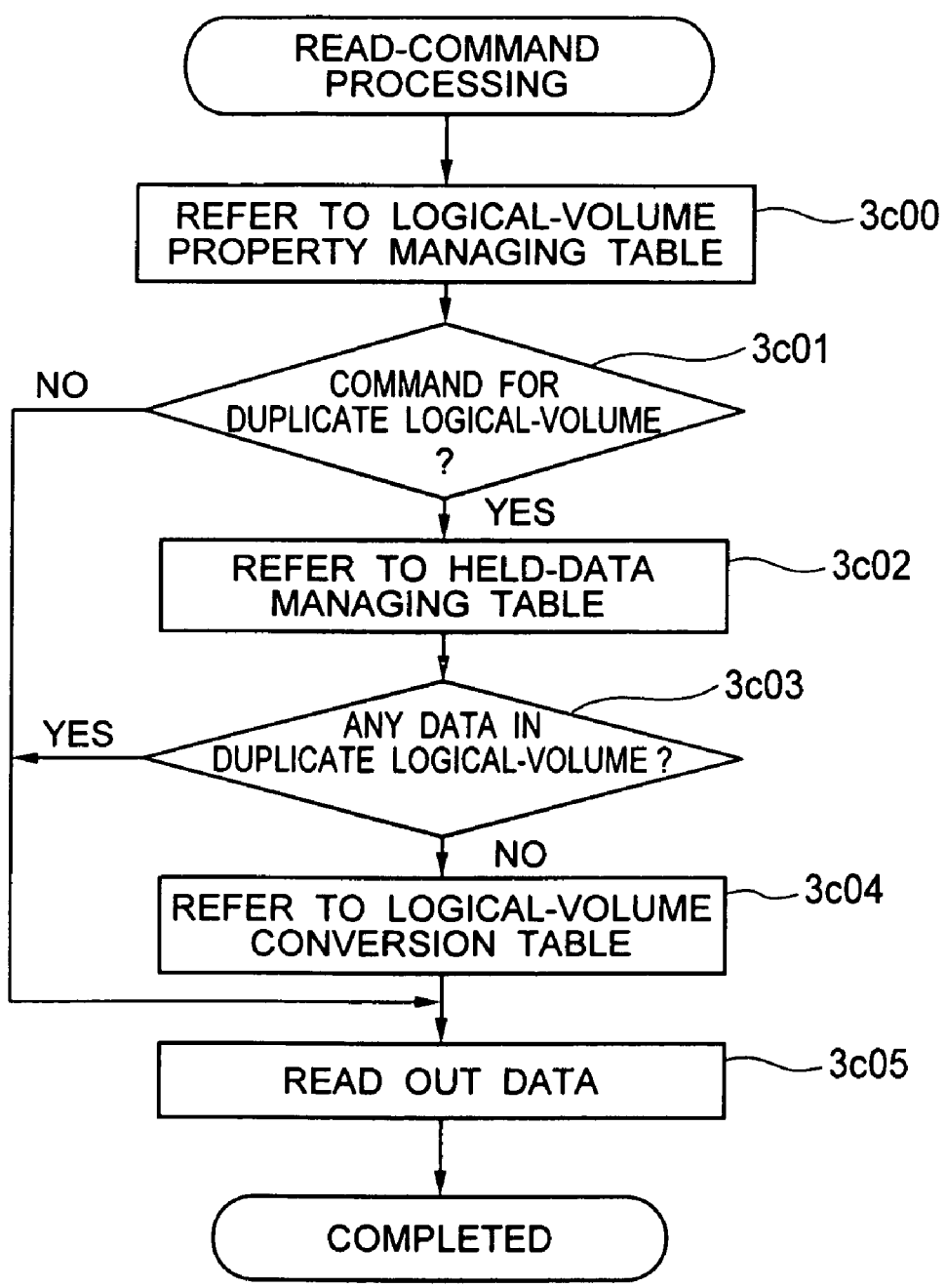
FIG. 6 is a flowchart for showing a read-command processing of the conventional snapshot action.

The configuration of the corresponding storage area managing table 708 is substantially the same as that of the corresponding storage area managing table 200 shown in FIG. 3, which comprises a logical-volume property managing table 201, a logical-volume conversion table 202, and a held-data managing table 203. The corresponding storage area managing table 708 is enclosed in a control memory 1003.

Figure 7:
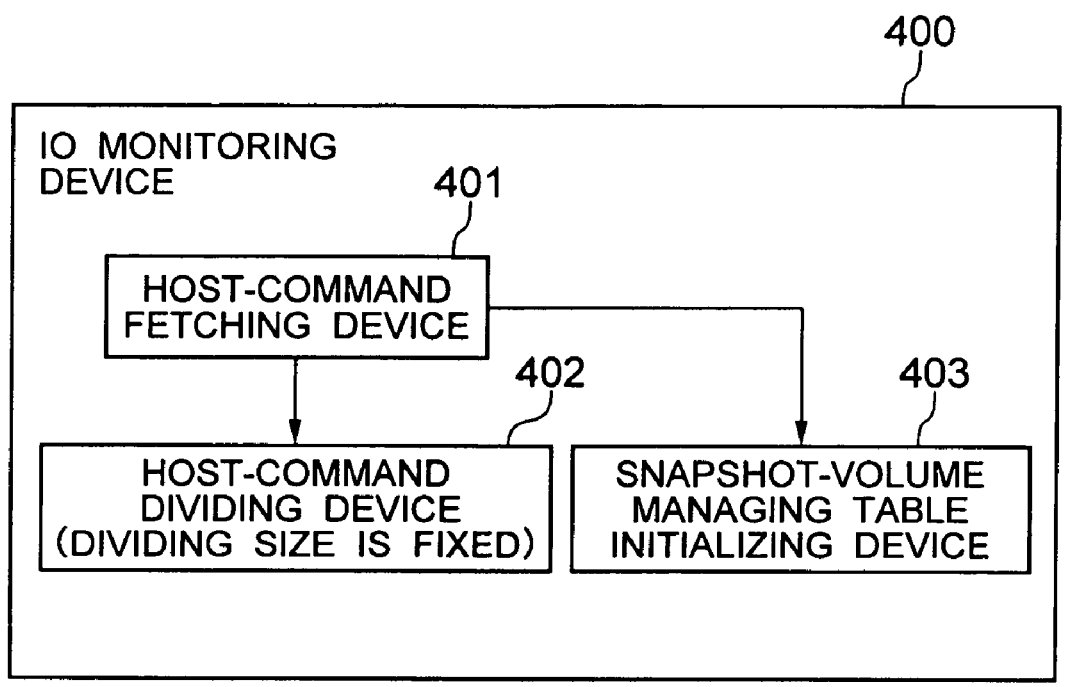
FIG. 7 is a functional block diagram for showing the schematic configuration of an IO monitoring device.

Like the conventional IO monitoring device 400 shown in FIG. 7, the IO monitoring device 707 of the interface controller 1001 contains a host-command fetching device 401, a host-command dividing device 402, and an initializing device 403 for initializing the corresponding storage area managing table 708.

Figure 12:
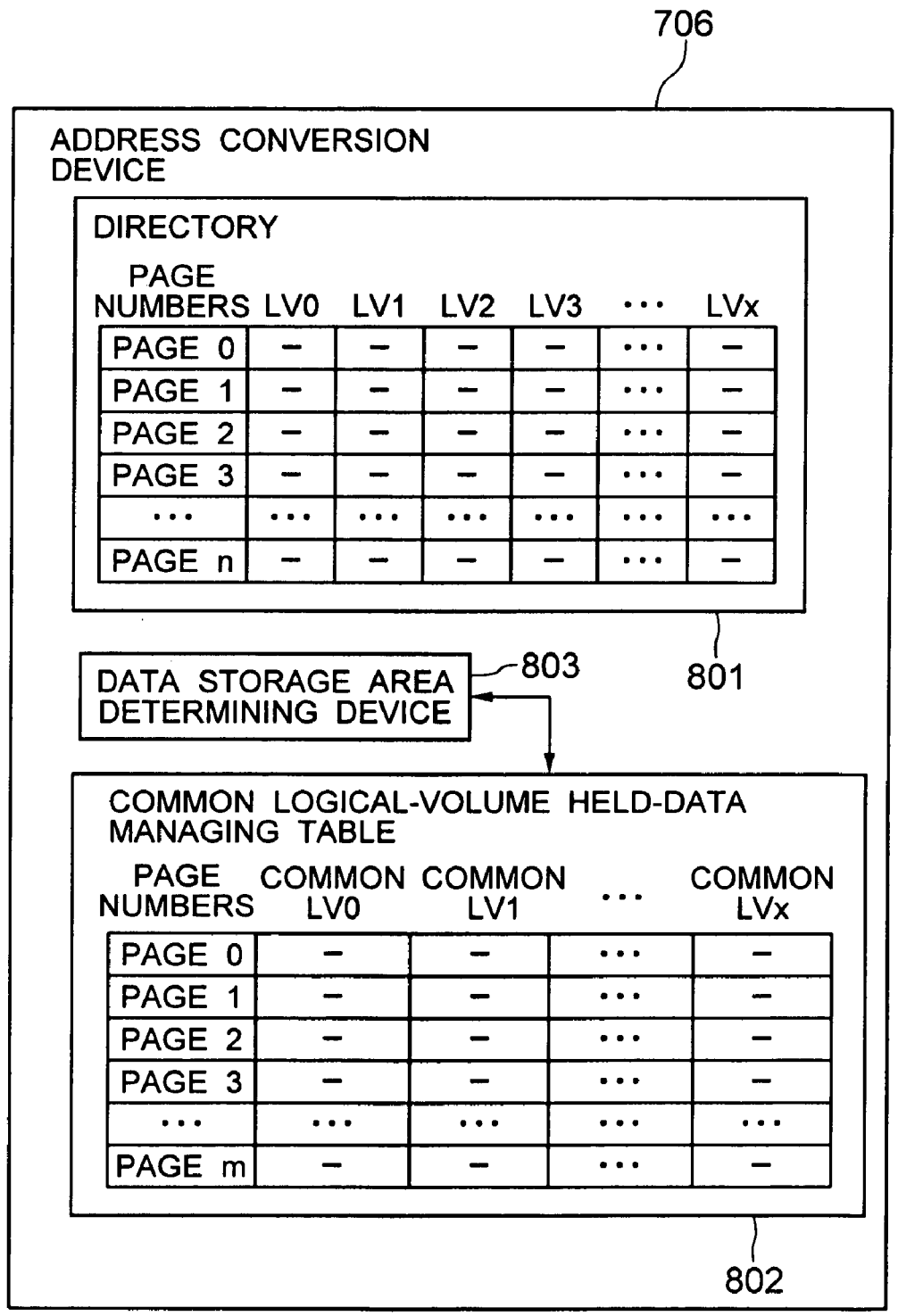
FIG. 12 is a functional block diagram for showing an address conversion device of the embodiment (First Embodiment)

The address conversion device 706 is peculiar to this embodiment and, as shown in FIG. 12, comprises a table 801 (referred to as directory hereinafter) for indicating which of the block in the common logical-volume the data of a plurality of the snapshot duplicate volumes (for example, data of the snapshot duplicate volumes 702, 704) are in. It also comprises a common logical-volume held-data managing table 802 and a data storage area determining device 803.

The address conversion device 706 and the data storage area determining device 803 are the functions achieved by the CPU 1004, and a directory 801 and the common logical-volume held-data managing table 802 are enclosed in the control memory 1003.

Figure 13:
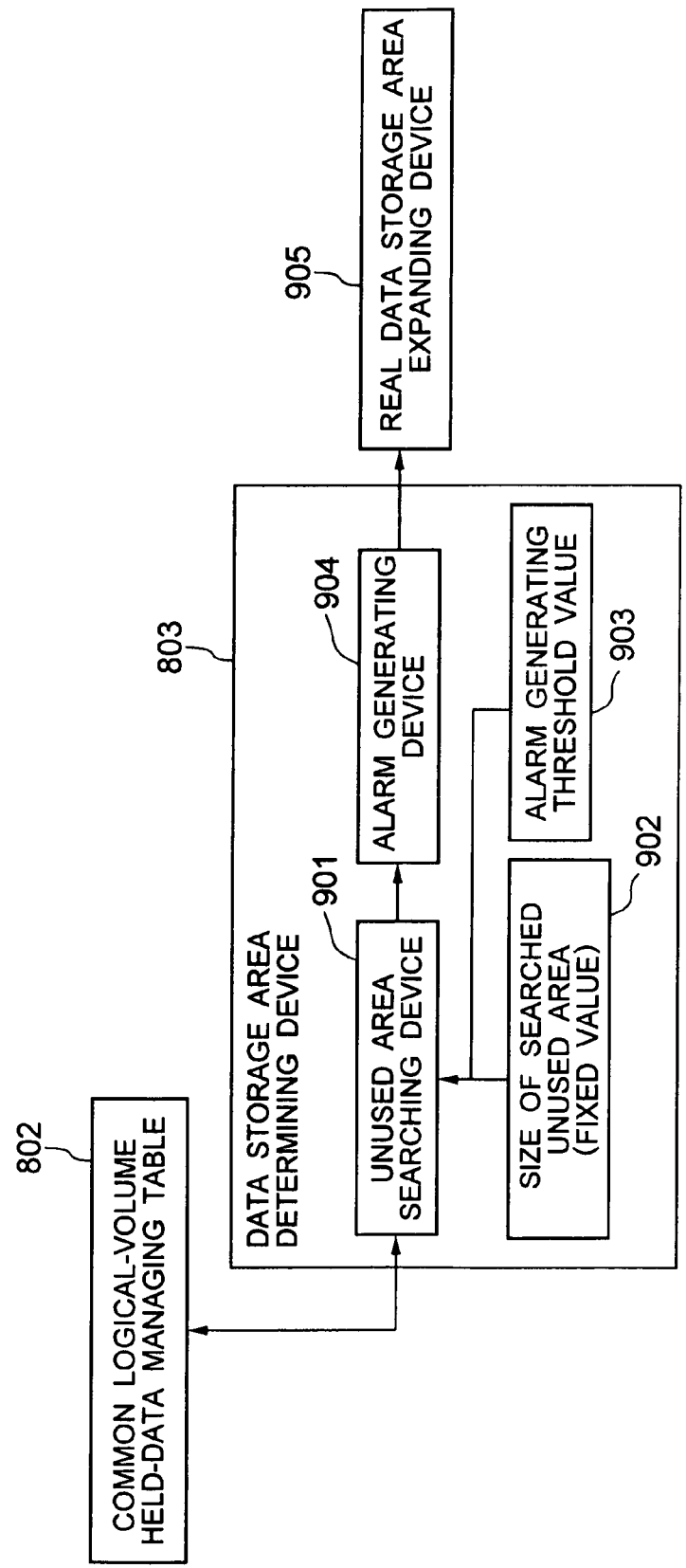
FIG. 13 is a functional block diagram for showing a data storage device of the embodiment (First Embodiment)

As shown in FIG. 13, the data storage area determining device 803 contains an unused area searching device 901, a storage unit 902 for storing the size of the searched unused area, a storage unit 903 for storing an alarm generating threshold value, and an alarm generating device 904.

The unused area searching device 901 and the alarm generating device 904 are achieved by using the CPU 1004 serving as a function achieving device, and the storage units 902, 903 are constituted by utilizing the storage area which is a part of the control memory 1003.

Next, the overall operation of the embodiment will be described in detail by referring to flowcharts of FIG. 14 to FIG. 17, which illustrate outlines of the processing performed by the CPU 1004 provided to the disk array subsystem 700 of the embodiment.

Figure 14:
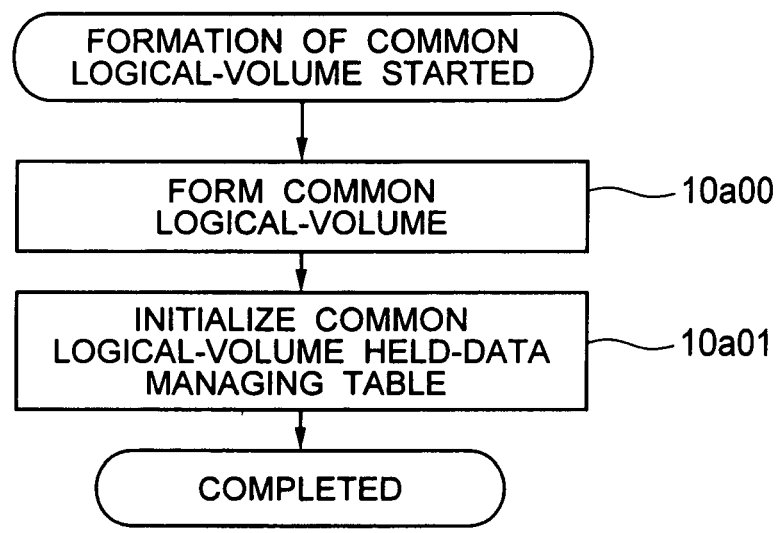
FIG. 14 is a flowchart for showing the forming processing of a common logical-volume of the embodiment (First Embodiment)

Before starting the snapshot action, as a preparation, the CPU 1004 of the disk array subsystem 700 forms the common logical-volume as an actual storage area of the data held by the snapshot duplicate volume according to the processing shown in FIG. 14.

Specifically, first, the CPU 1004 forms the common logical-volume 705 in a step 10a00.

The storage capacity of the common logical-volume 705 may be determined arbitrarily but it is desirable to be the storage capacity required at the moment by estimating the data amount to be duplicated.

When the unused area of the common logical-volume 705 becomes less than a standard value by an increase in the duplicated data amount, the common logical-volume is expanded or a new common logical-volume is additionally generated by an automatic processing of the CPU 1004 which functions as the real data storage area expanding device 905. In order to simplify the management of the storage capacity of the common logical-volume, it is desirable to standardize the storage capacity of the common logical-volume to be added within the disk array subsystem 700.

There is no data in each page of the common logical-volume 705 right after being formed by the processing of the step 10a00. Thus, by the initializing device 403 of the IO monitoring device 707, in the volume number section of the common logical-volume in the common logical-volume held-data managing table 802 functioning as the held-data managing device is initialized for indicating that there is no valid data (step 10a01).

Figure 15:
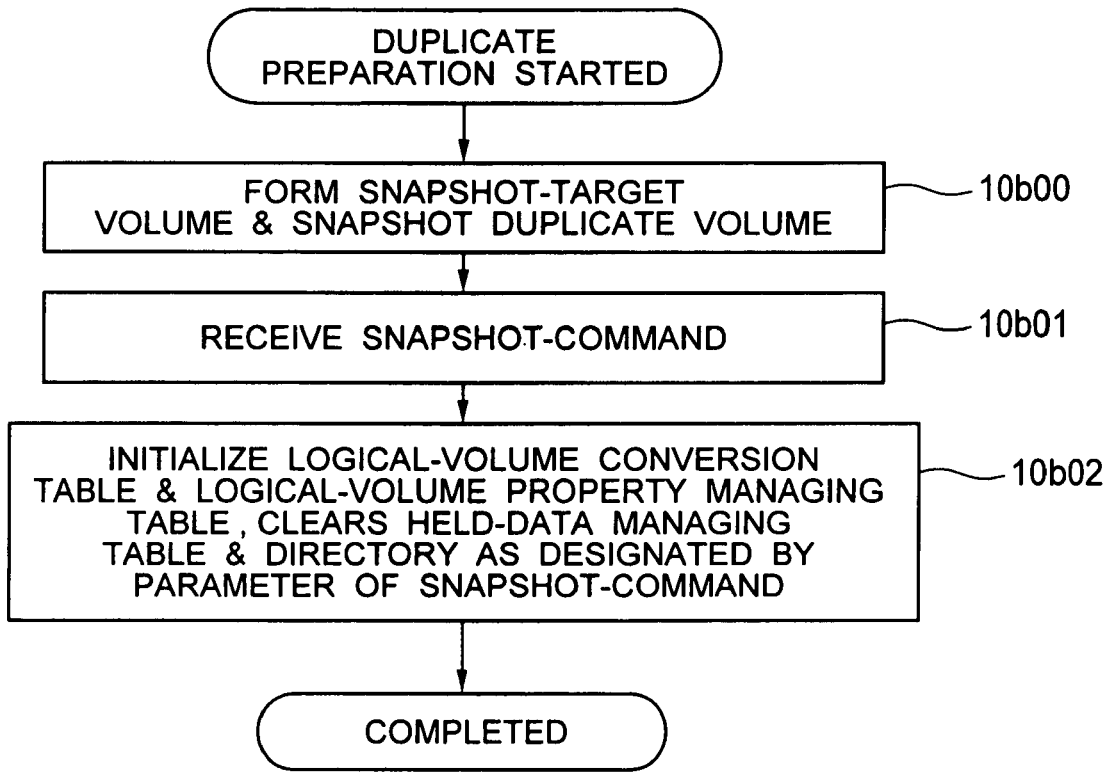
FIG. 15 is a flowchart for showing a preparation action of the embodiment (First Embodiment)
Figure 16:
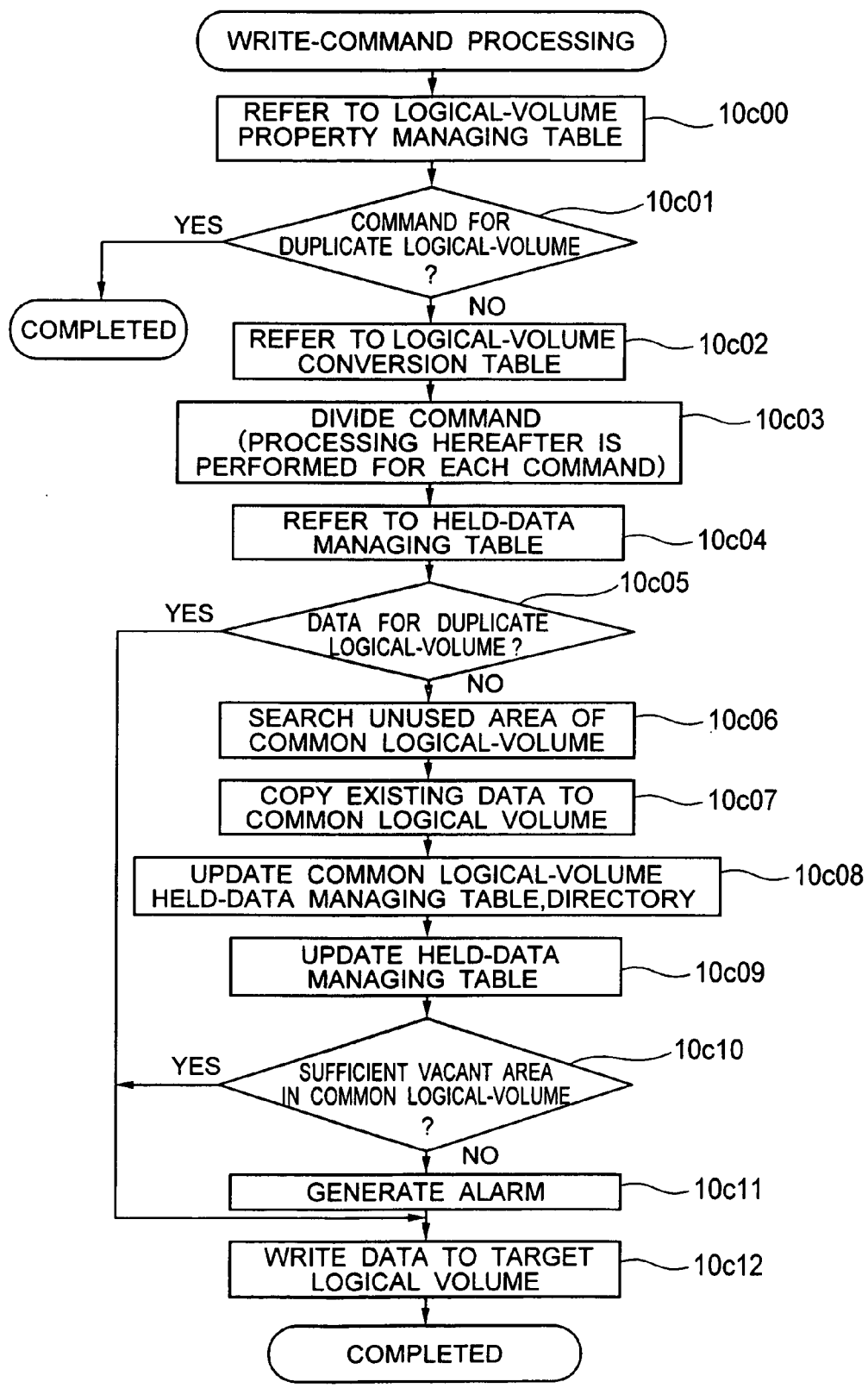
FIG. 16 is a flowchart for showing the processing of a write-command of the embodiment (First Embodiment)
Figure 17:
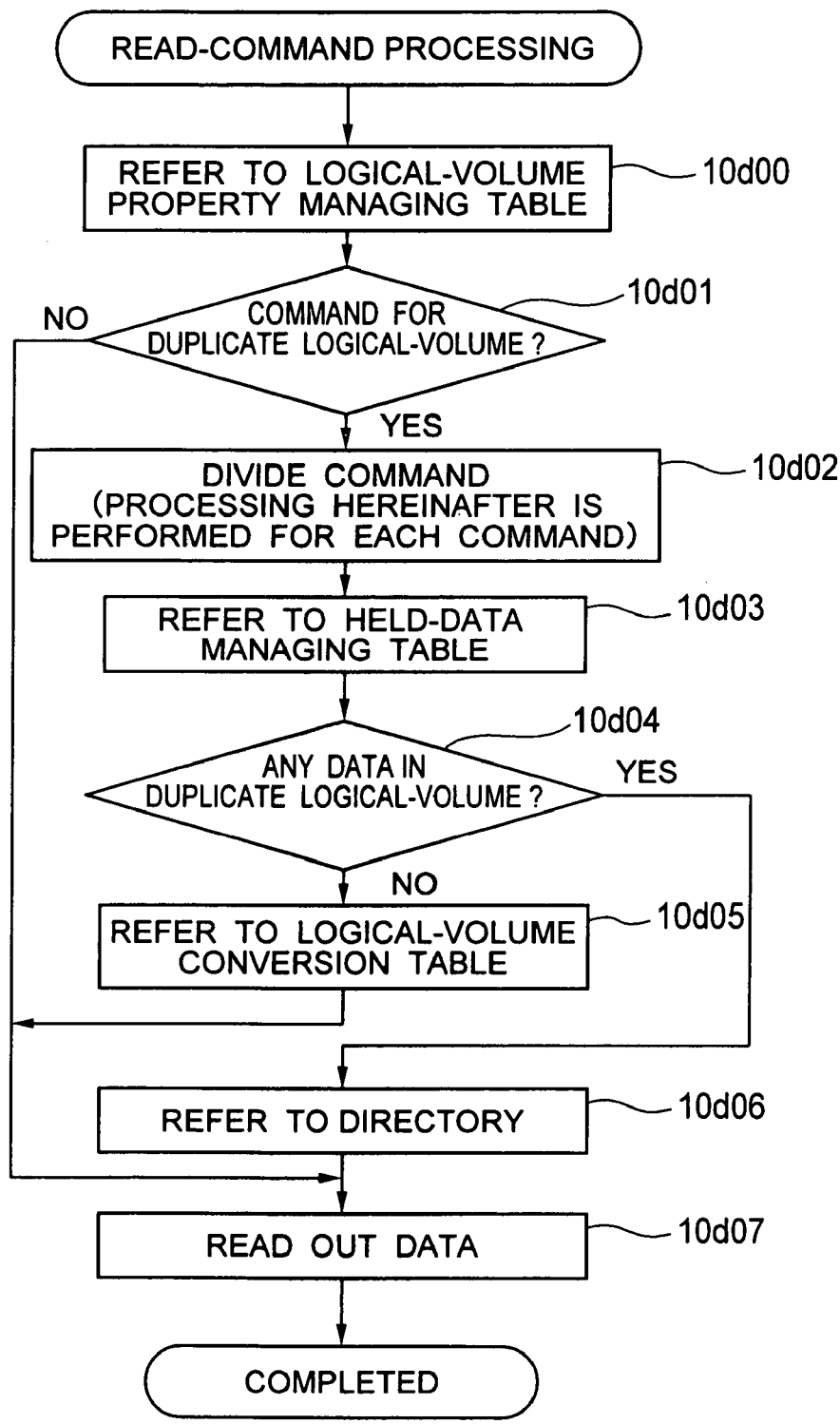
FIG. 17 is a flowchart for showing the processing of a read-command of the embodiment (First Embodiment)

Next, the CPU 1004 of the disk array subsystem 700 performs the processing for starting the snapshot action according to the processing shown in FIG. 15.

First, the CPU 1004 forms the snapshot duplicate volume having at least the same storage capacity as that of the snapshot-target volume in a step 10b00 shown in FIG. 15.

The snapshot-target volume may be formed at this stage or the already-existing logical-volumes such as the logical-volume 701, 703 and the like may be designated as the snapshot-target volume.

It is characteristic that, although the snapshot duplicate volume functioning as the duplicate data storage area has seemingly the same storage amount or more than that of the snapshot-target volume, the data of the snapshot are all stored in the common logical-volume 705. Thus, practically, the snapshot duplicate volume does not consume the storage capacity.

In other words, the snapshot duplicate volume is only a volume virtually built within the disk array subsystem 700 and does not have a substantial storage capacity.

Next, the disk array subsystem 700 receives a command from the host in a step 10b01. When it is judged by the IO monitoring device 707 that the command is a snapshot command, the corresponding storage area managing table 708 and the directory 801 as a part of the data storage area managing device are initialized by the initializing device 403 of the IO monitoring device 707.

Then, in a step 10b02, the property of the snapshot-target volume or the snapshot duplicate volume is set in the volume number section of the logical-volume in the logical-volume property managing table 201, and the volume number of the other volume as a pair is respectively set in each volume number section of the logical-volume conversion table 202. Further, the section of the snapshot duplicate volume of the held-data managing table 203 is initialized to indicate that there is no valid data and the section of the snapshot duplicate volume of the directory 801 is initialized to indicate that the data of the common logical-volume is not allotted.

It is possible to unify the held-data managing table 203 and the directory 801 as one since, while the data forms are different, the both show the position of the effective data of the snapshot duplicate volume.

Hereinafter, the snapshot target volume is to hold the volume image (so-called a snapshot or a shadow copy) of the snapshot-target volume at the time of receiving the snapshot command.

Next, the write-command processing will be described. When the disk array subsystem 700 receives a write-command and it is judged by the IO monitoring device 707 that it is a write-command for the volume being set for the snapshot, the write processing is executed according to the processing shown in FIG. 16.

Specifically, first, the CPU 1004 of the disk array subsystem 700 refers to the logical-volume property managing table 201 in a step 10c00 for judging whether or not it is a command for the snapshot-target volume (step 10c01). When it is judged as the command for the snapshot-target volume, the CPU 1004 refers to the logical-volume conversion table 202 in a step 10c02 and specifies the snapshot duplicate volume which forms a pair with the snapshot-target volume.

The processing performed when it is judged as a command for the snapshot duplicate volume is completed without writing to the volume, since writing to the snapshot duplicate volume is prohibited considering a normal use such as backup or the like. However, when writing to the snapshot duplicate volume is permitted, it proceeds to the following processing from a step 10c06.

The data held by the snapshot duplicate volume is managed by a memory unit peculiar to the disk array subsystem 700. The above-described write-command is divided by the host-command dividing device 402 in a step 10c03 so that the received data can be processed by each of the specific managing unit. The processing thereafter is repeatedly executed for the numbers of the divided commands.

Here, the managing unit peculiar to each disk array subsystem 700 is referred to as a page.

The held-data managing table 203 of the corresponding storage area managing table 708, the directory 801 of the address conversion device 706, and the common logical-volume held-data managing table 802 of the address conversion device 706 manage the presence of the data and the allotting state of the data with respect to the common logical-volume by each page.

In other words, the common logical-volume held-data managing table 802 which functions as a held-data managing device is a table which indicates the presence of the data by each page as a memory unit.

Next, the CPU 1004 refers to the held-data managing table 203 in a step 10c04 and judges whether or not there is set a value indicating the presence of data held in a position of the snapshot duplicate volume which corresponds to a position of the page on the snapshot-target volume where the data is to be written at the moment (step 10c05).

When it is judged that there is data held in the snapshot duplicate volume, that is, backup of the page has been already achieved, the data is written to the snapshot-target volume and the processing is completed.

In the meantime, when it is judged that there is no data held in the snapshot duplicate volume, the unused area searching device 901 searches the common logical-volume held-data managing table 802 and refers it with the size of the search-target unused area set in the storage unit 902. Then, the storage area of the data stored in the corresponding position of writing data in the snapshot-target volume at the moment is searched. The next storage area to be used in the common logical-volume 705 is so selected to be in a contiguous arrangement from the front address and the data is stored in that storage area (step 10c06).

Here, it is possible to shorten the searching time by improving the searching efficiency through forming the common logical-volume held-data managing table 802 with a hierarchy structure. For example, in addition to indicating the presence of the data by each page as a memory unit, it is possible to indicate the presence of data by each memory-unit group in which a plurality of memory units are put together and, further, to provide a table indicating the presence of data of a plurality of memory-unit groups collectively.

Thereafter, the CPU 1004 copies the page in the corresponding position of writing data in the snapshot-target volume described above to the data storage position on the common logical-volume 705 which is determined in the step 10*c*06. The value for indicating that the page is in use is set in the common logical-volume held-data managing table 802 functioning as the held-data managing device, and the volume number and the page number of the common logical-volume to which the data is stored is set in the page of the snapshot duplicate volume of the directory 801 which functions as a part of the data storage area managing device. Further, the value for indicating that there is data being held is set in the page of the snapshot duplicate volume in the held-data managing table 203 (step 10*c*07, step 10*c*08, step 10*c*09).

In the embodiment, the directory 801 is built by a configuration in which the common logical-volume number and the page address are mapped in the storage area on the snapshot duplicate volume side. Inversely, it may be in a configuration in which the directory 801 is formed by mapping the snapshot duplicate volume number and the page address in the storage area on the common logical-volume side.

Next, the CPU 1004 judges whether or not the unused area of the common logical-volume becomes less than the alarm generating threshold value set in the storage unit 903 by the use of the common logical-volume of this time.

When it becomes less, the CPU 1004 functioning as the alarm generating device 904 generates an alarm for encouraging the expansion or generation of the common logical-volume (step 10*c*10, step 10*c*11).

The processing associated with the expansion or generation of the common logical-volume may be started by a command from the host-command or may be started automatically as the inside processing of the disk array subsystem 700 at the time of detecting the alarm generation.

In the embodiment, the overall storage area of the common logical-volume can be increased by selecting either expansion or generation of the volume. When the expansion of the volume is selected, the CPU 1004 functioning as the real data storage area expanding device 905 redefines the storage area contiguous to the target common logical-volume as the storage area of the common logical-volume. When the generation of the volume is selected, the CPU 1004 functioning as the real data storage area expanding device 905 detects the vacant area with the size of the set value or larger and sets the vacant area as the storage area which newly functions as the common logical-volume.

In this manner as described, the used state of the common logical-volume as the real data storage area can be managed by the common logical-volume held-data managing table 802 and the substantial storage capacity of the common logical-volume can be increased as necessary by the real data storage area expanding device 905. Thus, it is possible to surely store the data in the common logical-volume even though the initial capacity of the common logical-volume is set relatively small.

At last, the CPU 1004 writes the data inputted from the host to the snapshot-target volume and the processing is completed (step 10*c*12).

As described above, when the command is being divided, the above-described processing is repeatedly executed and the processing is completed at the point where writing of the last divided data is completed.

Next, the read-command processing will be described.

Figure 8:
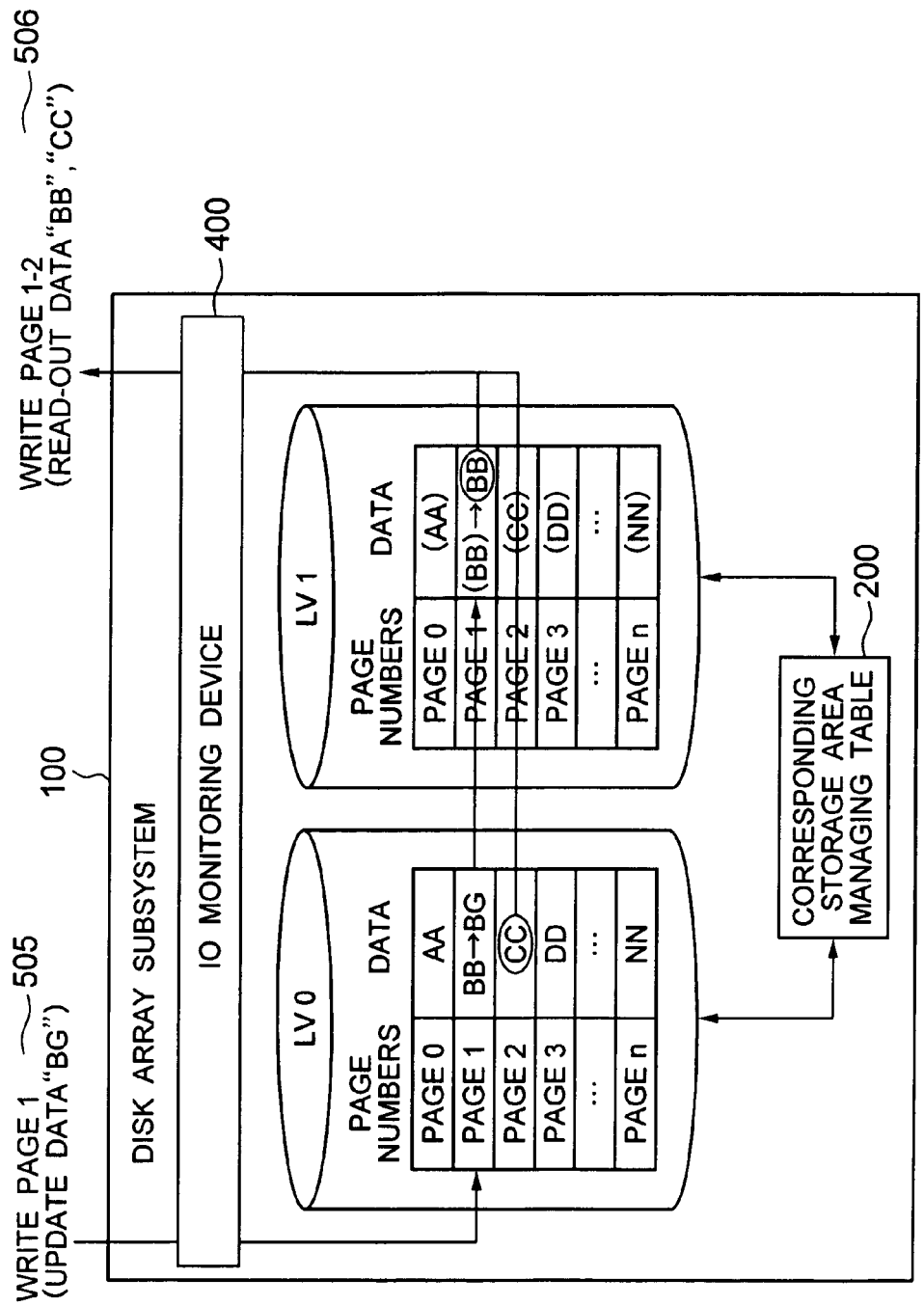
FIG. 8 is an illustration for showing a specific example of a conventional snapshot action (the state after writing is performed to a snapshot duplicate volume)
Figure 9:
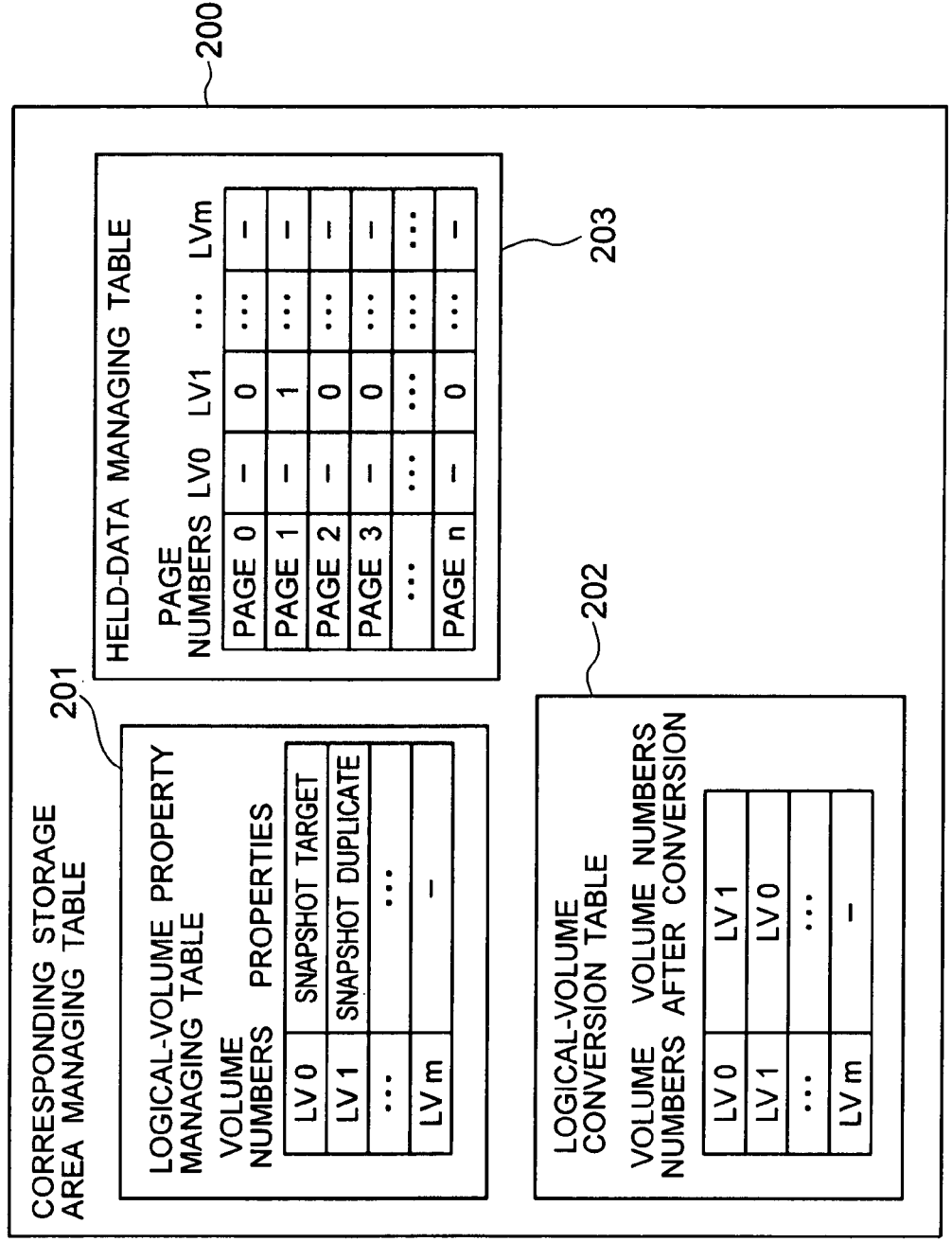
FIG. 9 is a conceptual figure for showing a corresponding storage area managing table after writing is performed to the snapshot duplicate volume in the conventional case.

As for the read-command processing, when the disk array subsystem 700 receives a read-command and the IO monitoring device 707 judges that it is a read-command for the volume being set as the snapshot, it is executed according to the processing shown in FIG. 8.

In a step 10*d*00, first, the CPU 1004 refers to the logical-volume property managing table 201, and judges whether or not it is a read-command for the snapshot-target volume (step 10*d*01). When it is the command for the snapshot-target volume, the data is read out from the snapshot-target volume and the processing is completed (step 10*d*07).

In the meantime, when it is judged that the command is for the snapshot duplicate volume (step 10*d*01), the command is divided into a page unit as in the case of the write-command (step 10*d*02), and the processing thereafter is repeatedly executed for the numbers of the divided commands.

In this case, first, the CPU 1004 refers to the held-data managing table 203 in a step 10*d*03, and judges whether or not the value indicating that there is data being held is set in the page position on the snapshot duplicate volume from which the data is to be read out (step 10*d*04). When it is judged that there is the data held in the snapshot duplicate volume, the data is read out from the volume number and the page number of the common logical-volume set in the page of the snapshot duplicate volume in the directory 801 (step 10*d*06, step 10*d*07).

Further, when it is judged that there is no data held in the snapshot duplicate volume, the CPU 1004 refers to the logical-volume conversion table 202 and specifies the snapshot-target volume corresponding to the snapshot duplicate volume (step 10*d*05). Then, the data is read out from the corresponding page on the snapshot-target volume (step 10*d*07).

As described above, the snapshot duplicate volume functioning as the duplicate data storage area is not substantial and all the data of the snapshot duplicate volume are actually stored in the common logical-volume serving as the real data storage area. Therefore, even when duplicating a large number of volumes, it only requires the storage capacity that is a difference between the snapshot-target volume and the snapshot duplicate volume to be consumed, i.e. the storage capacity corresponding to the update data amount for the snapshot-target volume after receiving the snapshot command.

Next, the operation of the embodiment will be described by referring to a specific example.

Figure 18:
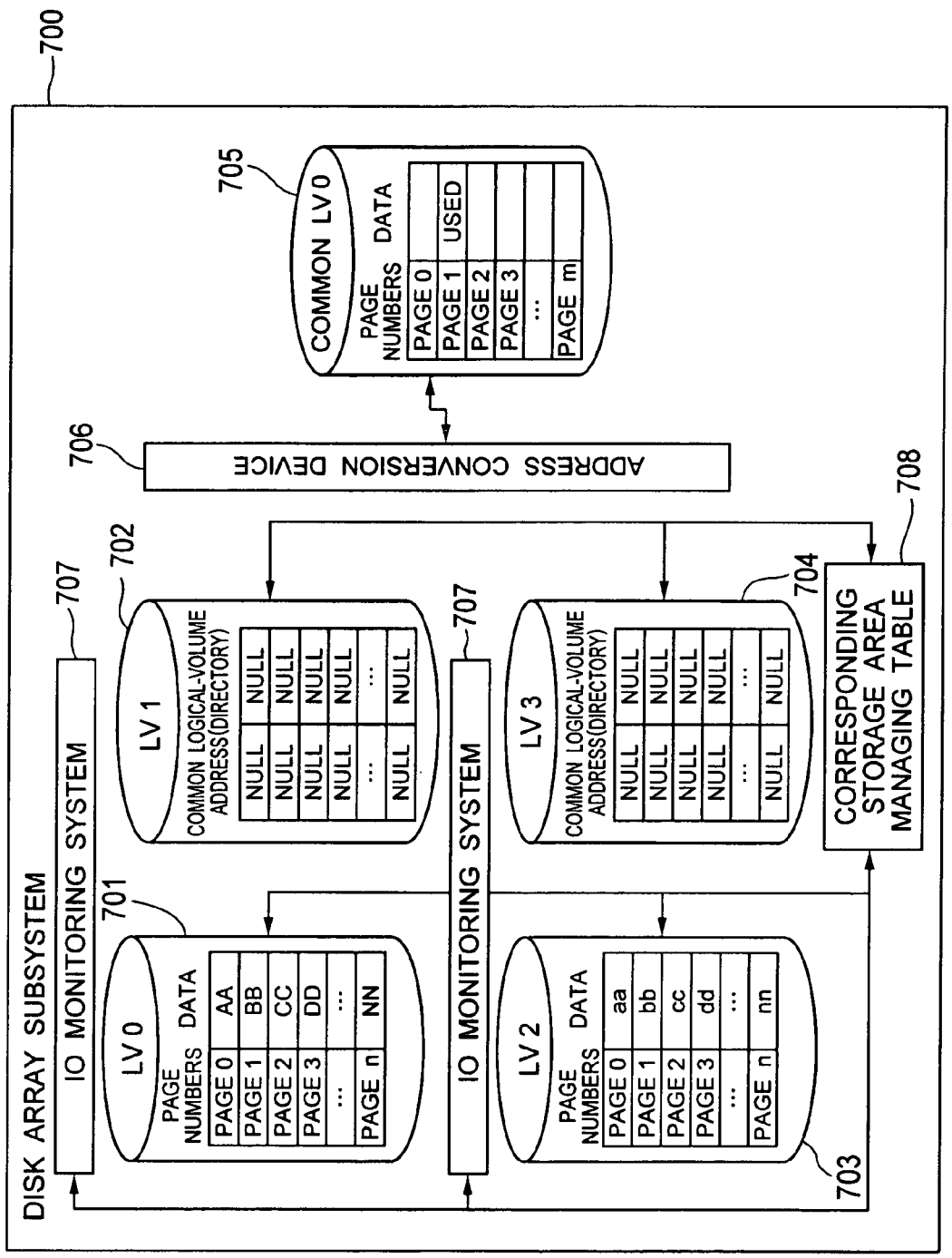
FIG. 18 is a conceptual figure for showing the state of the disk array subsystem of the embodiment right after receiving the snapshot command (First Embodiment)
Figure 19:
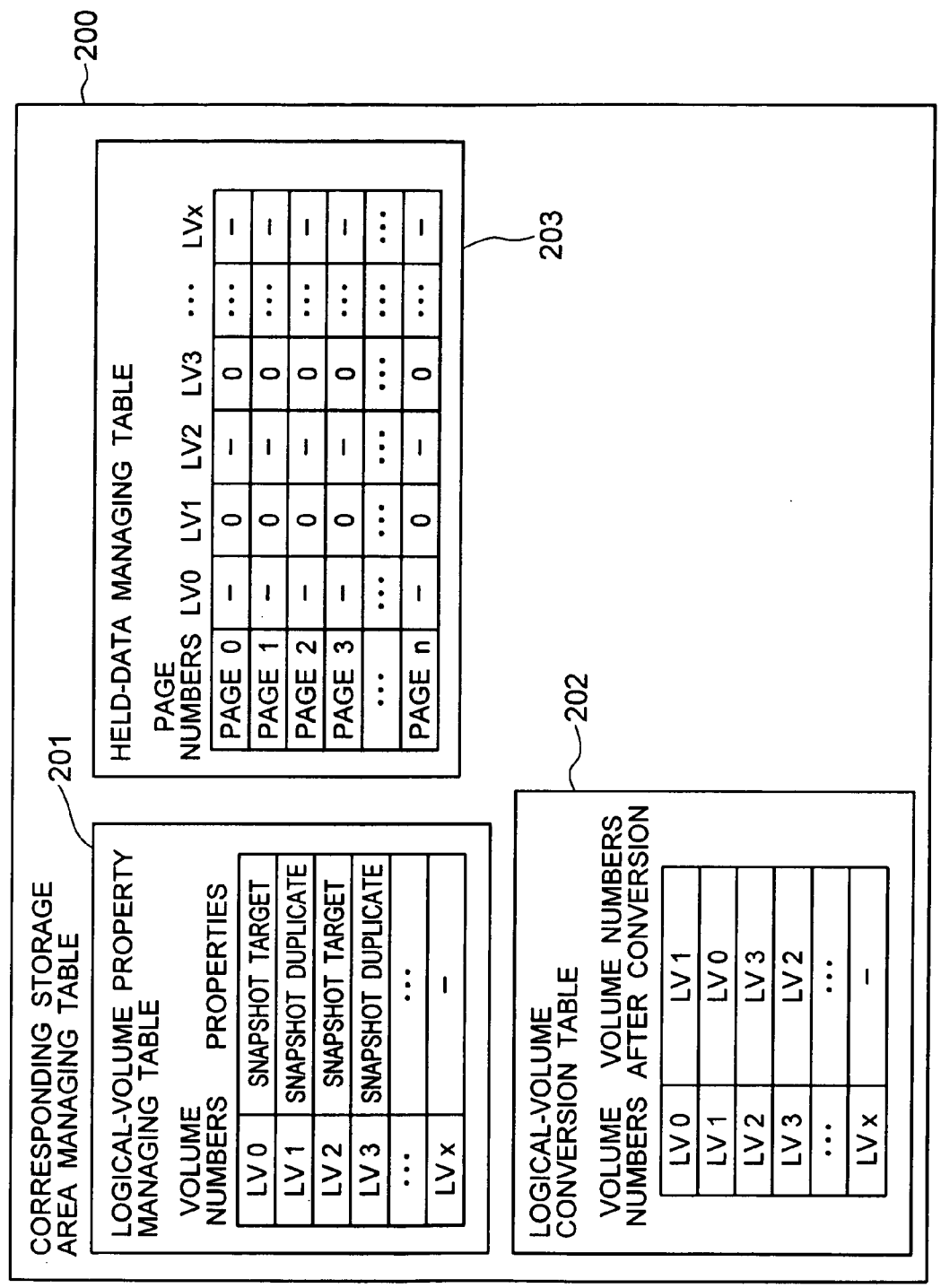
FIG. 19 is a conceptual figure for showing the corresponding storage area managing table of the embodiment right after receiving the snapshot command (First Embodiment)
Figure 20:
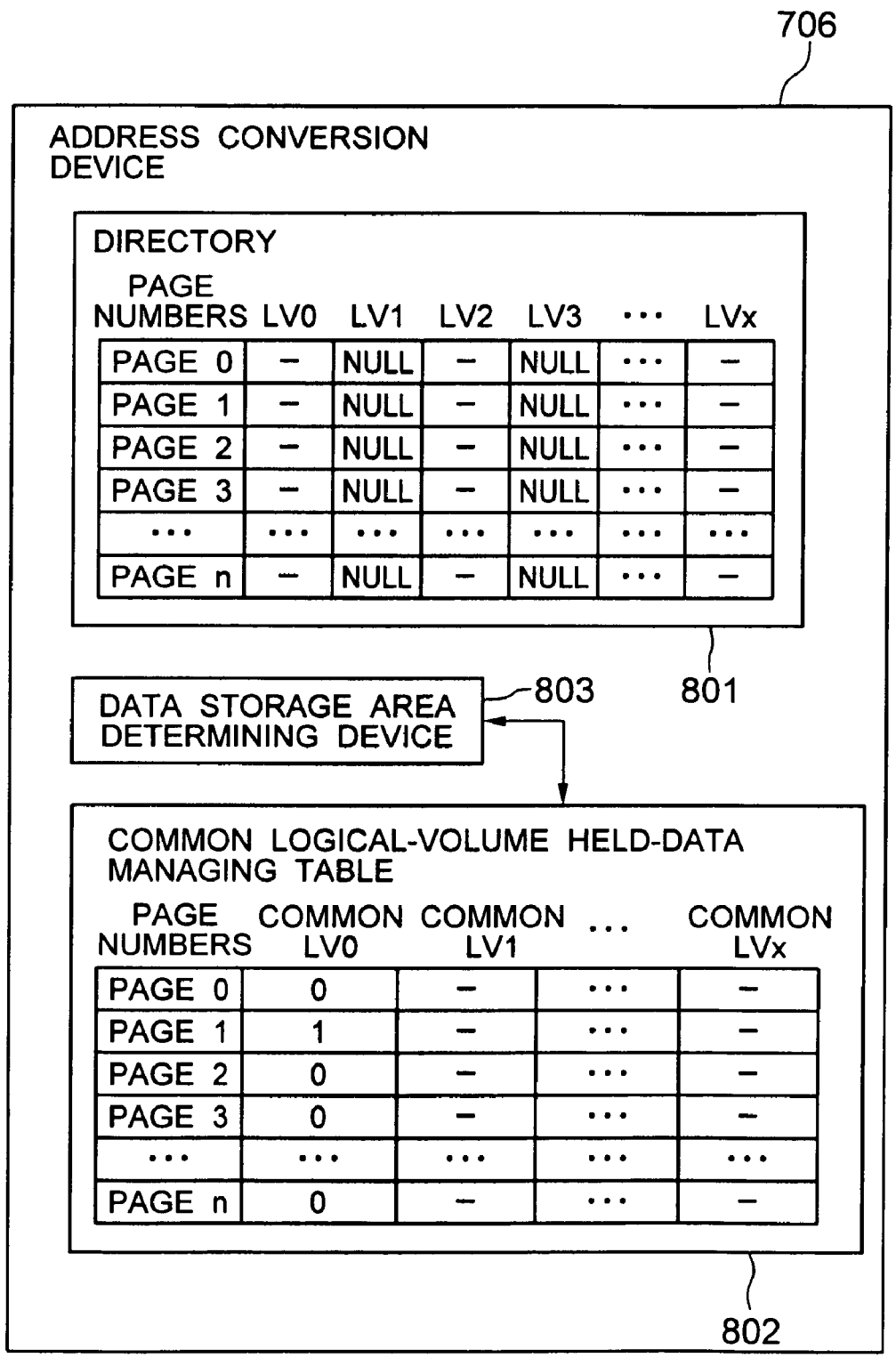
FIG. 20 is a conceptual figure for showing the address conversion device of the embodiment right after receiving the snapshot command (First Embodiment)

Here, shown as an example in FIG. 18, FIG. 19, FIG. 20 is a state right after receiving a snapshot command in a disk array subsystem 700 which comprises a first snapshot-target volume 701, a first snapshot duplicate volume 702 having the same storage capacity as that of the snapshot-target volume 701, a second snapshot-target volume 703, a second snapshot duplicate volume 704 having the same storage capacity as that of the snapshot-target volume 703, and a common logical-volume 705 which actually stores the data of the snapshot duplicate volumes 702, 704.

For starting the snapshot action, first, the CPU 1004 forms the common logical-volume 705 as the real data storage area, and then clears the value in the section of the volume number LV0 allotted by corresponding to the common logical-volume 705 to "0" for indicating that there is no data in the common logical-volume held-data managing table (802 in FIG. 20).

In order to clearly illustrate the feature of the embodiment, the value "1" is set for the page 1 on assumption that it has been already used.

Next, the CPU 1004 starts the snapshot action and forms the first snapshot duplicate volume 702 having the same capacity as that of the first snapshot-target volume 701 and the second snapshot duplicate volume 704 having the same capacity as that of the second snapshot-target volume 703. The numbers of these logical-volumes are defined to be LV0, LV1, LV2, LV3, respectively.

Upon receiving a snapshot executing command for setting the snapshot duplicate volume LV1 as the snapshot of the snapshot-target volume LV0 and also setting the snapshot duplicate volume LV3 as the snapshot of the snapshot-target volume LV2, the CPU 1004 sets the respective property to the sections of each volume number in the logical-volume property managing table (201 in FIG. 19), sets the volume number of the other volume as a pair of the snapshot action in the sections of each volume number in the logical-volume conversion table (202 in FIG. 19), clears the sections of the volume number LV1 and the volume number LV3 in the held-data managing table (203 in FIG. 19) by setting the value "0" indicating that it is unused, and sets "null" in the sections of the volume number LV1 and the volume number LV3 in the directory (801 in FIG. 20) for indicating that there is no common logical-volume being allotted. These are the preparations performed before the snapshot action.

Next, the process of storing the data to the snapshot duplicate volume will be described.

The write-command and the read-command for the snapshot duplicate volume are divided into each memory unit called as a page by the host-command dividing device (402 in FIG. 34) in the same manner as that of the conventional case. The page size is desirable to be about some tens to hundreds KB. Here, it is supposed to be 32 KB.

Provided that a write-command (1409 in FIG. 21) for the snapshot-target volume LV0 is received at this moment, the CPU 1004 recognizes it as a write-command for the first snapshot-target volume LV0 by referring to the volume number LV0 in the logical-volume property managing table (201 in FIG. 19).

Next, the address conversion device 706 recognizes that the snapshot duplicate volume of the snapshot-target volume LV0 is the snapshot duplicate volume LV1 by referring to the logical-volume conversion table (202 in FIG. 19) and converts the target of the command to the snapshot duplicate volume LV1.

Next, the CPU 1004 refers to the held-data managing table (203 in FIG. 19) and judges whether or not data is written before in the respective page of the snapshot duplicate volume LV1. If data has been already written, "AF" which corresponds to the first 32 KB of the data of the write-command (1409 in FIG. 21) is written to the page 0 of the snapshot-target volume LV0, and "BG" which indicates the remaining 32 KB is written to the next page 1. Thereby, the processing corresponding to the command being divided into two is completed.

In the meantime, when there is no data written in the respective page of the snapshot duplicate volume LV1, the target of the command is converted to the data storing storage area determined by the data storage area determining device (803 in FIG. 20). In this case, the unused area searching device (901 on FIG. 13) searches the contiguous vacant areas in the size of the searched unused area (902 in FIG. 13) from the common logical-volume LV0. It may be the vacant area searched in the first place with the size of the unused area (902 in FIG. 13) or larger, or may be the vacant area determined by other algorithm.

In this example, the page 0 of the snapshot duplicate volume LV1 is converted to the page 0 as the first vacant page of the common logical-volume LV0, and the page 1 of the snapshot duplicate volume LV1 is converted to the page 2 as the next vacant page of the common logical-volume LV0. The value "AA" of the page 0 of the snapshot-target volume LV0 and the value "BB" of the page 1 of the snapshot-target volume LV0 are copied to the respective pages.

Then, "the volume number LV0 of the common logical-volume and page 0" is set in the page 0 in the section of the volume number LV in the directory (801 in FIG. 20). Also, "the volume number LV0 of the common logical-volume and page 2" is set in the page 1 of the same, while the value "1" is set in the section of the volume number LV0 of the common logical-volume in the position between the page 0 and page 2 in the common logical-volume held-data managing table (802 in FIG. 20) for indicating that it is being used.

Then, the value "1" for indicating that there is data being held is set in the page 0 and page 1 in the same manner performed in the section of the volume number LV1 in the held-data managing table (203 in FIG. 19).

Subsequently, the CPU 1004 judges whether or not the vacant area of the common logical-volume LV0 has exceeded the alarm generating threshold value through the writing data in the page 0 and the page 2 of the common logical-volume LV0 by the unused area searching device (901 in FIG. 13). When it is judged that it has exceeded the threshold value, the alarm generating device (904 in FIG. 13) generates an alarm for encouraging an increase in the common logical-volume.

At last, the data "AF" is written to the page 0 of the snapshot-target volume LV0 and the data "BG" is written to the page 1. Thereby, the processing corresponding to the command being divided into two is completed.

Next, provided that a write-command (1410 in FIG. 21) for the snapshot-target volume LV2 is received, the data of the page 1 of the snapshot-target volume LV2 is copied to the page 3 as a first vacant page of the common logical-volume LV0 after going through the same processing as the write-command to the snapshot-target volume LV0 described above. Then, the data "bk" is written to the page 1 of the snapshot-target volume LV2.

Figure 21:
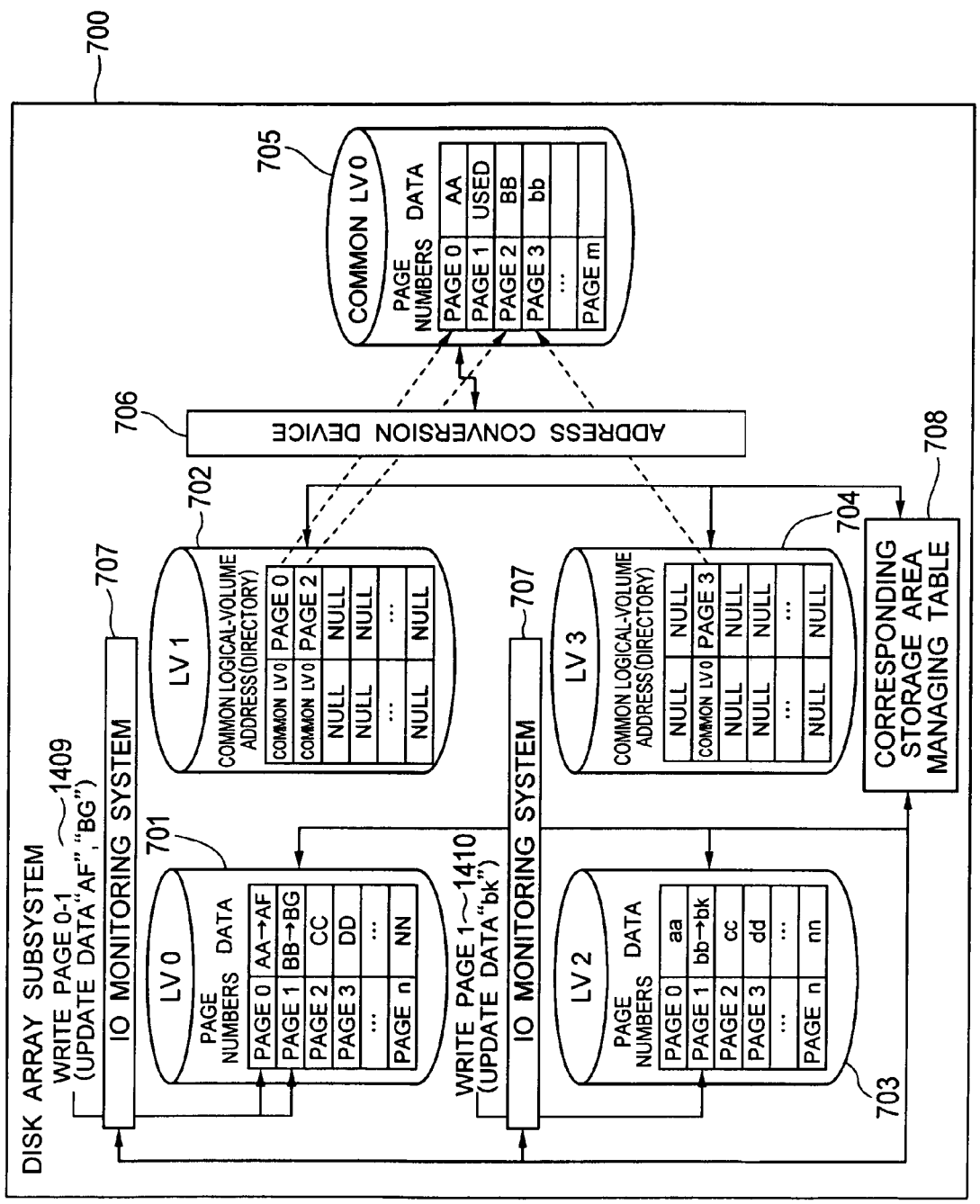
FIG. 21 is a conceptual figure for showing the state of the disk array subsystem of the embodiment after writing is performed to the snapshot duplicate volume (First Embodiment)
Figure 22:
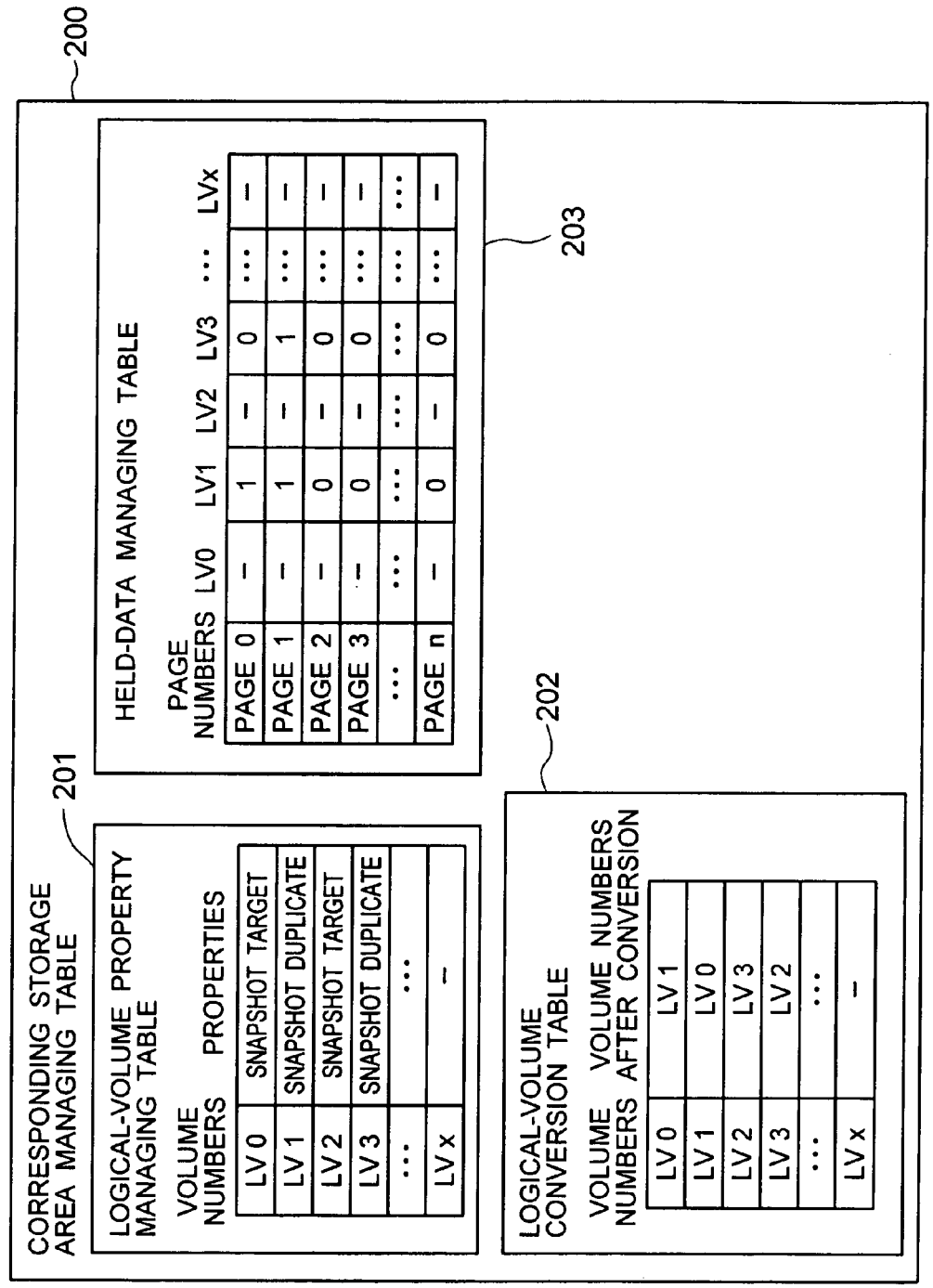
FIG. 22 is a conceptual figure for showing the state of the corresponding storage area managing table of the embodiment after writing is performed to the snapshot duplicate volume (First Embodiment)
Figure 23:
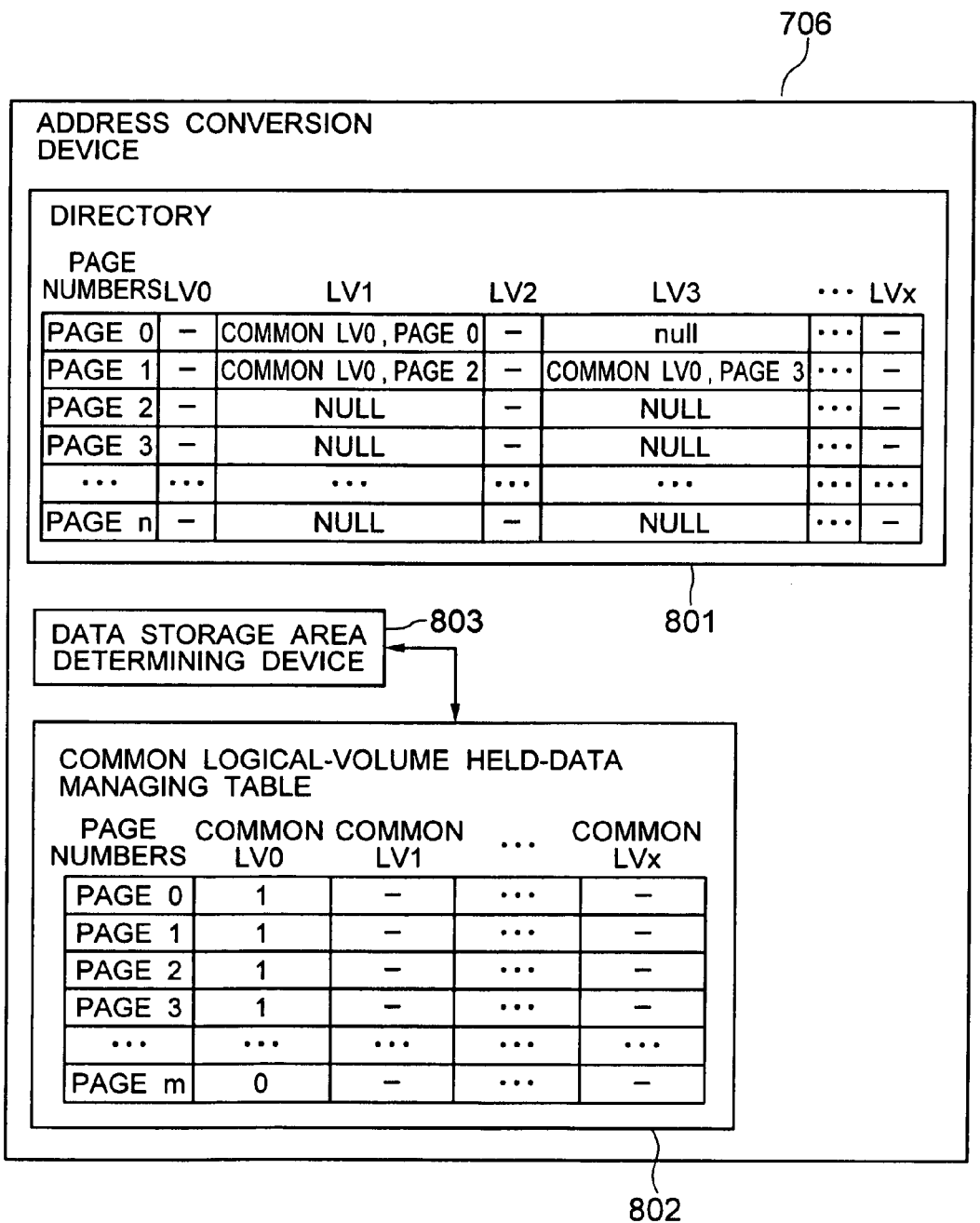
FIG. 23 is a conceptual figure for showing the state of the address conversion device of the embodiment after writing is performed to the snapshot duplicate volume (First Embodiment)

The states after executing the above-described two write-commands (1409 and 1410 in FIG. 21) are shown in FIG. 21, FIG. 22, and FIG. 23.

As described above, all the data to be stored in a plurality of the snapshot duplicate volumes LV1, LV3—are collectively managed by the common logical-volume LV0.

Second Embodiment

Next, the memory unit managing device for managing the memory unit set in the common logical-volume will be described by referring to an embodiment in which it is provided to the address conversion device 706.

Figure 24:
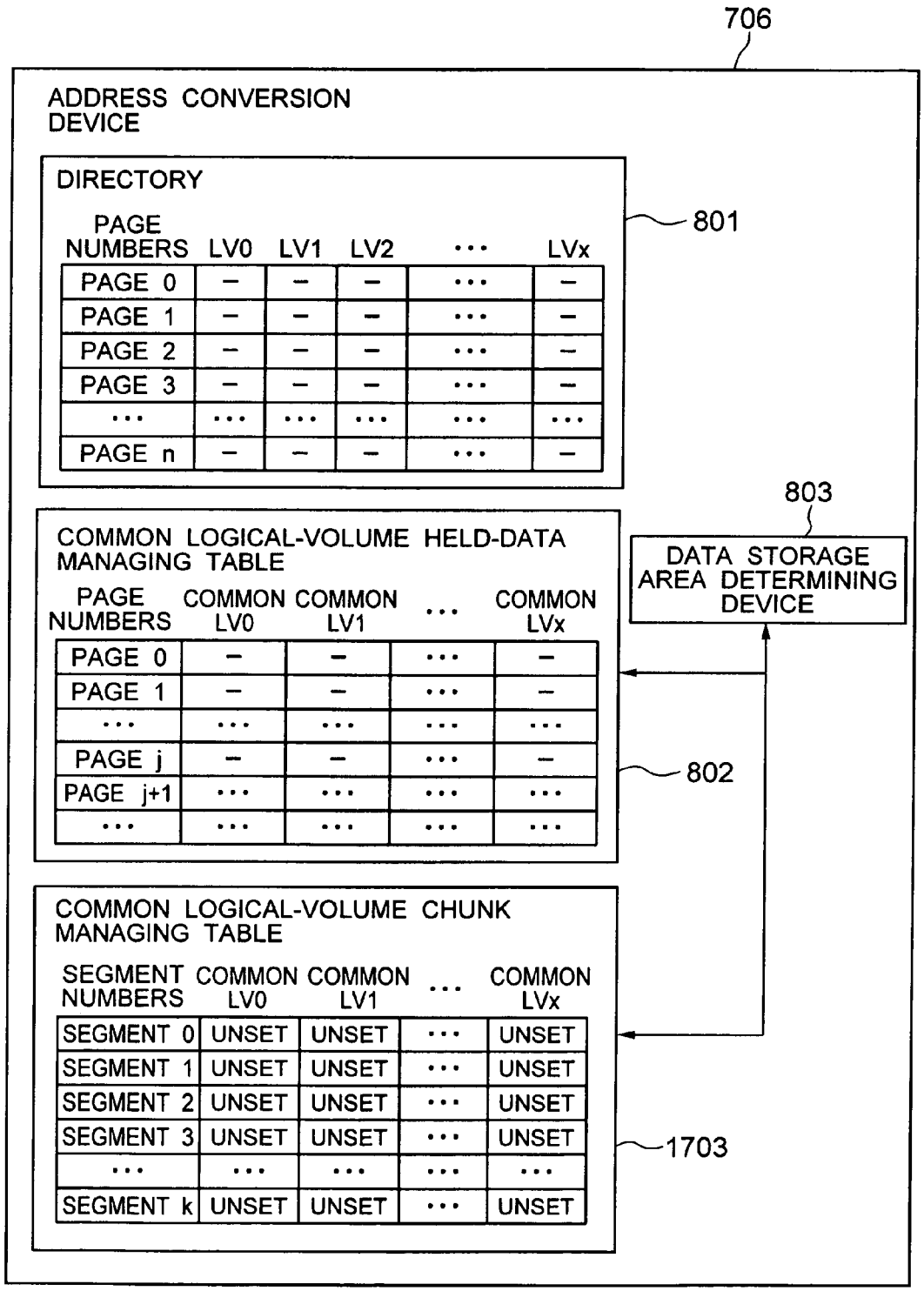
FIG. 24 is a conceptual figure for showing an address conversion device of another embodiment to which the present invention is applied (Second Embodiment)

As shown in FIG. 24, the address conversion device 706 of the embodiment comprises a directory 801, a common logical-volume held-data managing table 802, a data storage area determining device 803, and a common logical-volume chunk managing table 1703 which functions as a memory unit managing device. The common logical-volume chunk managing table 1703 is enclosed in a control memory 1003.

Figure 25:
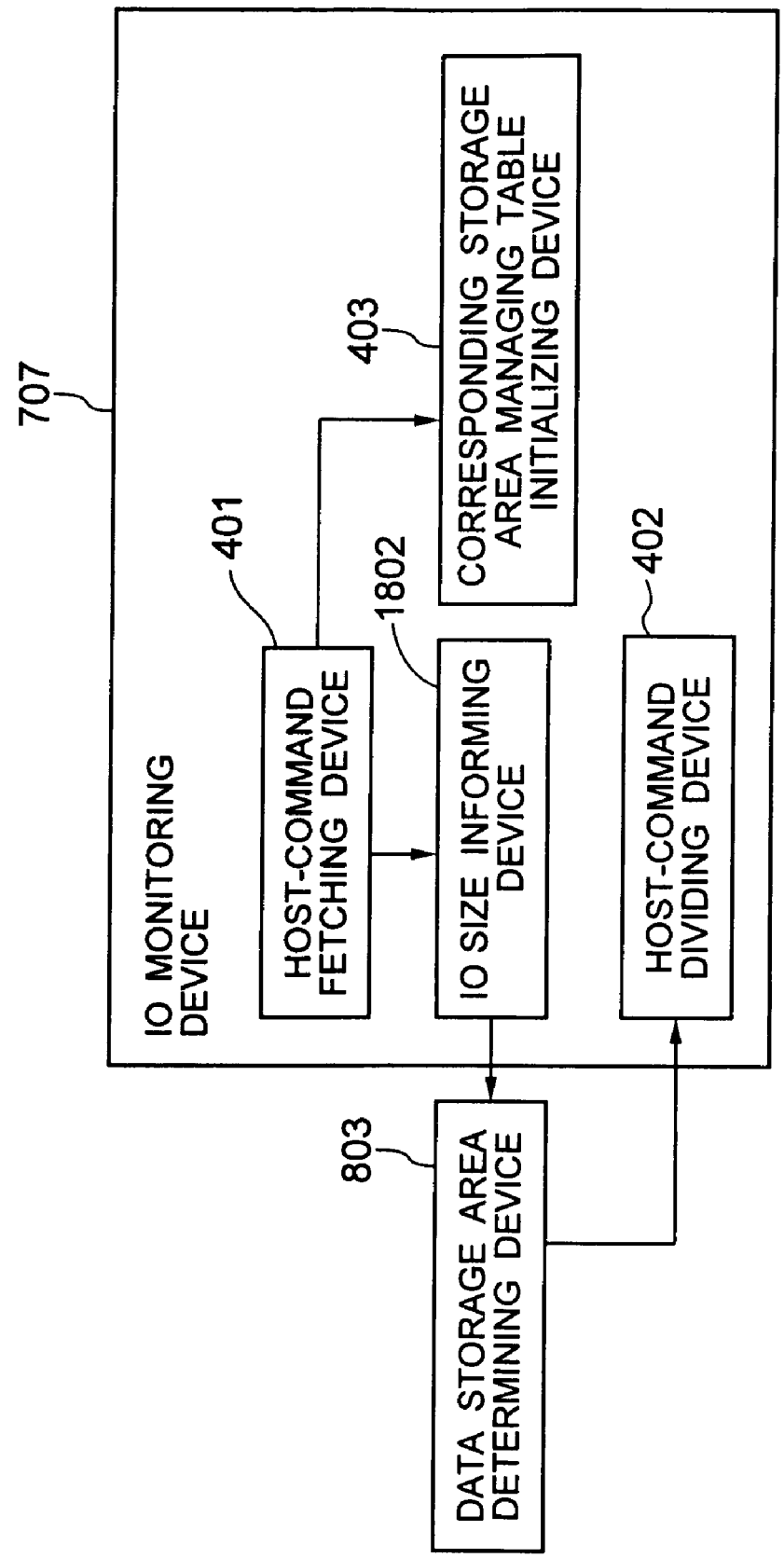
FIG. 25 is a functional block diagram for showing an IO monitoring device of the embodiment (Second Embodiment)

Further, as shown in FIG. 25, the IO monitoring device 707 comprises a host-command fetching device 401, an IO size informing device 1802, an initializing device 403 of corresponding storage area managing table, and a host-command dividing device 403.

Figure 26:
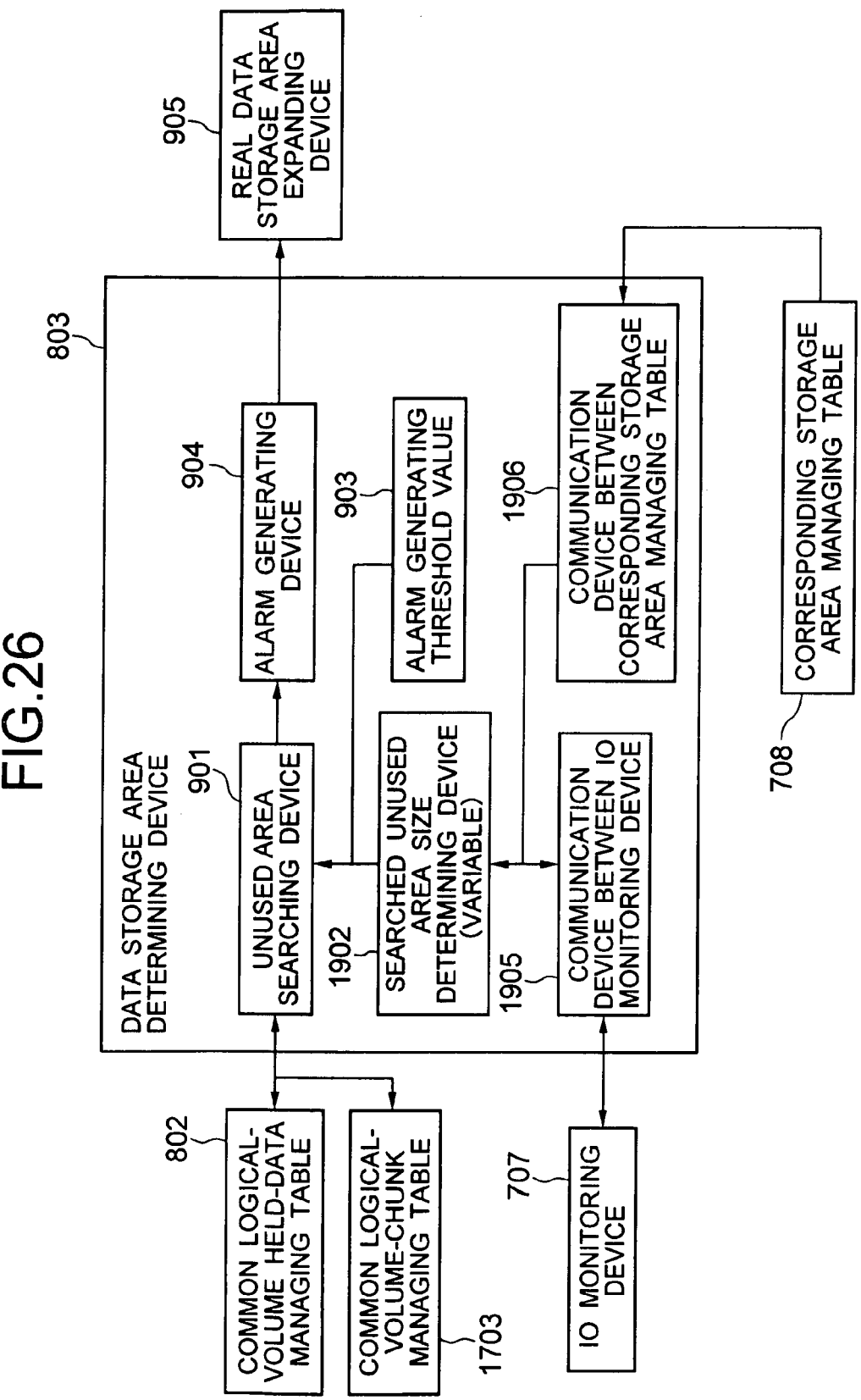
FIG. 26 is a functional block diagram for showing a data storage area determining device of the embodiment (Second Embodiment)

Then, as shown in FIG. 26, the data storage area determining device 803 comprises an unused area searching device 901, a searched unused area size determining device 1902, and alarm generating device 904, a storage unit 903 for storing the alarm generating threshold value, and a communication device 1905 for communicating with the IO monitor device 707, and a communication device 1906 for communicating with the corresponding storage area managing table 708.

Except that it comprises the common logical-volume chunk managing table 1703, the IO size informing device 1802, and the communication devices 1905, 1906, it is the same as the above-described disk array subsystem 700 of the first embodiment in regards to the substantial configuration.

In the embodiment, writing of the data to the snapshot duplicate volume is not performed by the memory unit peculiar to the disk array subsystem 700 but performed by the size which is determined kinetically according to the IO size designated by the write-command. This embodiment is different from the above-described first embodiment in this respect. Here, the writing size which is kinetically determined is referred to as a chunk.

Further, the common logical-volume is divided into managing units referred to as segments and the chunk size to be stored in the segment is set in each segment, so that there is no writing by different chunk sizes to be performed in a single segment.

In this case, when a write-command from the host is received, the IO monitoring device 707 informs the IO size of the command to the data storage area determining device 803 through the IO size informing device (1802 in FIG. 25) and the unused area size determining device (1902 in FIG. 25) determines the chunk size from the informed IO size and the memory unit (page size) peculiar to the disk array subsystem 700. Further, the unused area searching device (1901 in FIG. 25) refers the chunk size to the common logical-volume chunk managing table (1703 in FIG. 24) for determining the corresponding segment, and searches the vacant area of the common logical-volume for storing the data.

Further, when the corresponding segment is not found, the CPU 1004 functioning as the data storage area managing device sets the above-described chunk size (determined chunk size) anew for the segment in which the chunk size is unset, and the data is stored in the segment. The processing hereinafter is the same as the case of the above-described first embodiment.

In this embodiment, the common logical-volume is divided into units called as the segments, the chunk size is set in each of the segments, and the data is written to the segment which corresponds to the IO size of the write-command. Thus, the write data designated by a single command is not to be dispersed on the common logical-volume over a plurality of the segments, so that deterioration in the access performance can be surely prevented as long as there is no careless deleting of data being performed.

Next, the operation of the embodiment will be described by referring to a specific example.

The preparation performed before the snapshot is the same as the case of the above-described first embodiment. Thus, only the process of storing data to the snapshot duplicate volume will be described herein.

In the embodiment, the writing size to the snapshot duplicate volume is determined kinetically according to the IO size of the write-command. In order to simplify the chunk size management, it is desirable to set the chunk size to be an integral multiple of the managing unit (page) peculiar to the disk array subsystem 700.

Provided that a write-command (2009 in FIG. 27) for the first snapshot-target volume LV0 is received at this moment, the IO size is informed to the data storage area determining device (803 in FIG. 26) from the IO monitoring device (707 in FIG. 25), and it is determined by the unused area size determining device (1902 in FIG. 26) that the chunk size of the data "AF", "BG" is two pages (64 KB).

However, the chunk size is adjusted to be one page (32 KB) in the case where it is determined that there has been data already written in the page 0 of the snapshot duplicate volume LV1 after judging it through: recognizing that the command is the write-command for the snapshot-target volume LV0 by referring to the volume number LV0 in the logical-volume property managing table (201 in FIG. 19), converting the target of the command to the first snapshot duplicate volume LV1 by referring to the logical-volume conversion table (202 in FIG. 19), and judging whether or not writing has been performed before in the respective page of the snapshot duplicate volume LV1 by referring to the held-data managing table (203 in FIG. 19).

Figure 28:
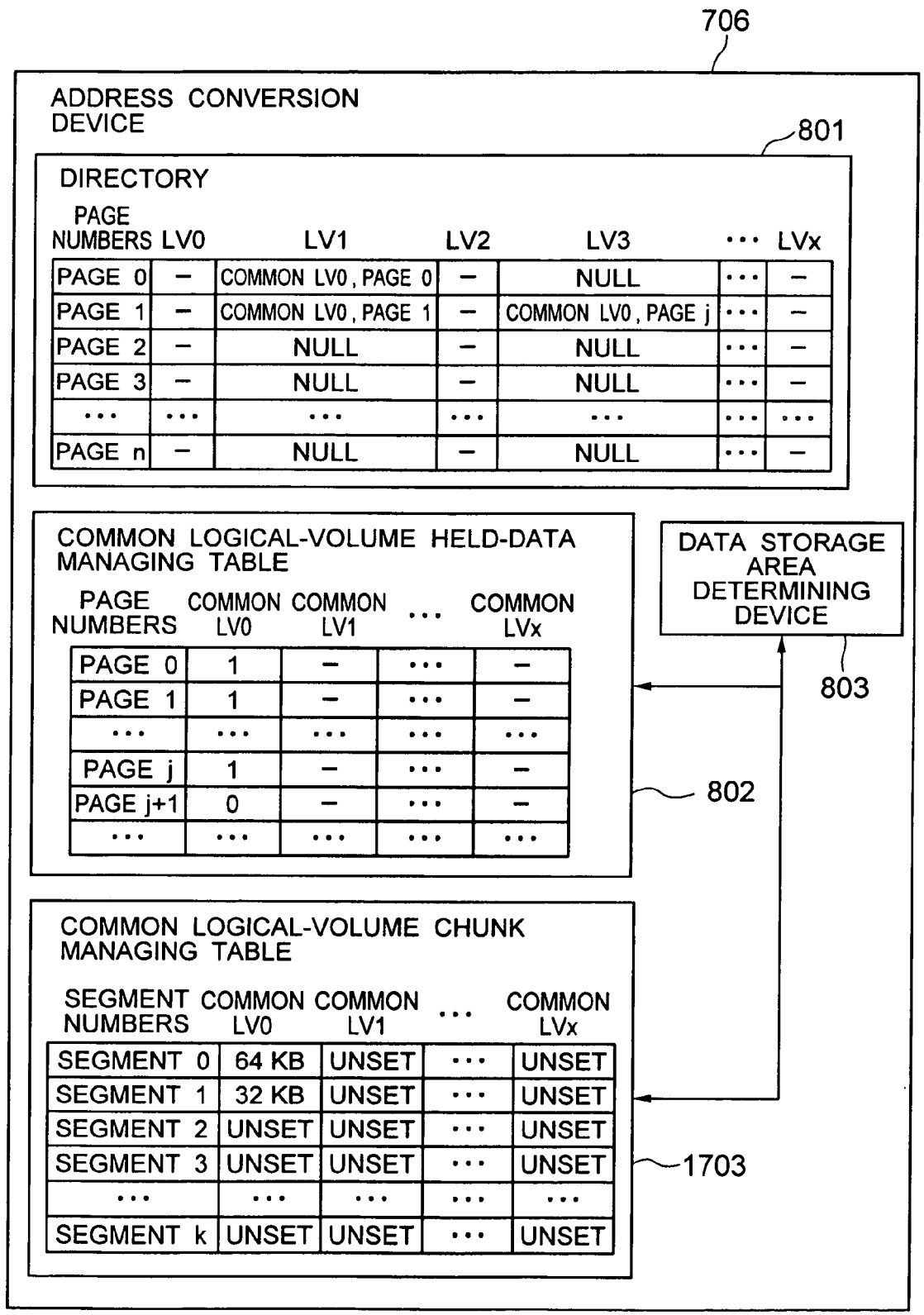
FIG. 28 is a conceptual figure for showing the state of the address conversion device of the embodiment after writing is performed to the snapshot duplicate volume (Second Embodiment)

Next, the unused area searching device (901 in FIG. 26) determines or selects the segment which corresponds to the chunk size by referring to the common logical-volume chunk managing table (1703 in FIG. 28). The segment size is desirable to be in the size of about some MB to some GB in consideration of the size of the managing table and the search efficiency.

In the initial state, the chunk sizes are unset in all the segments, so that the CPU 1004 functioning as the data storage area managing device sets the segment 0 as the first segment of the common logical-volume LV0 to be the segment to which the data with the chunk size of 64 KB is written. The operation hereinafter is the same as the case of the above-described first embodiment.

Figure 27:
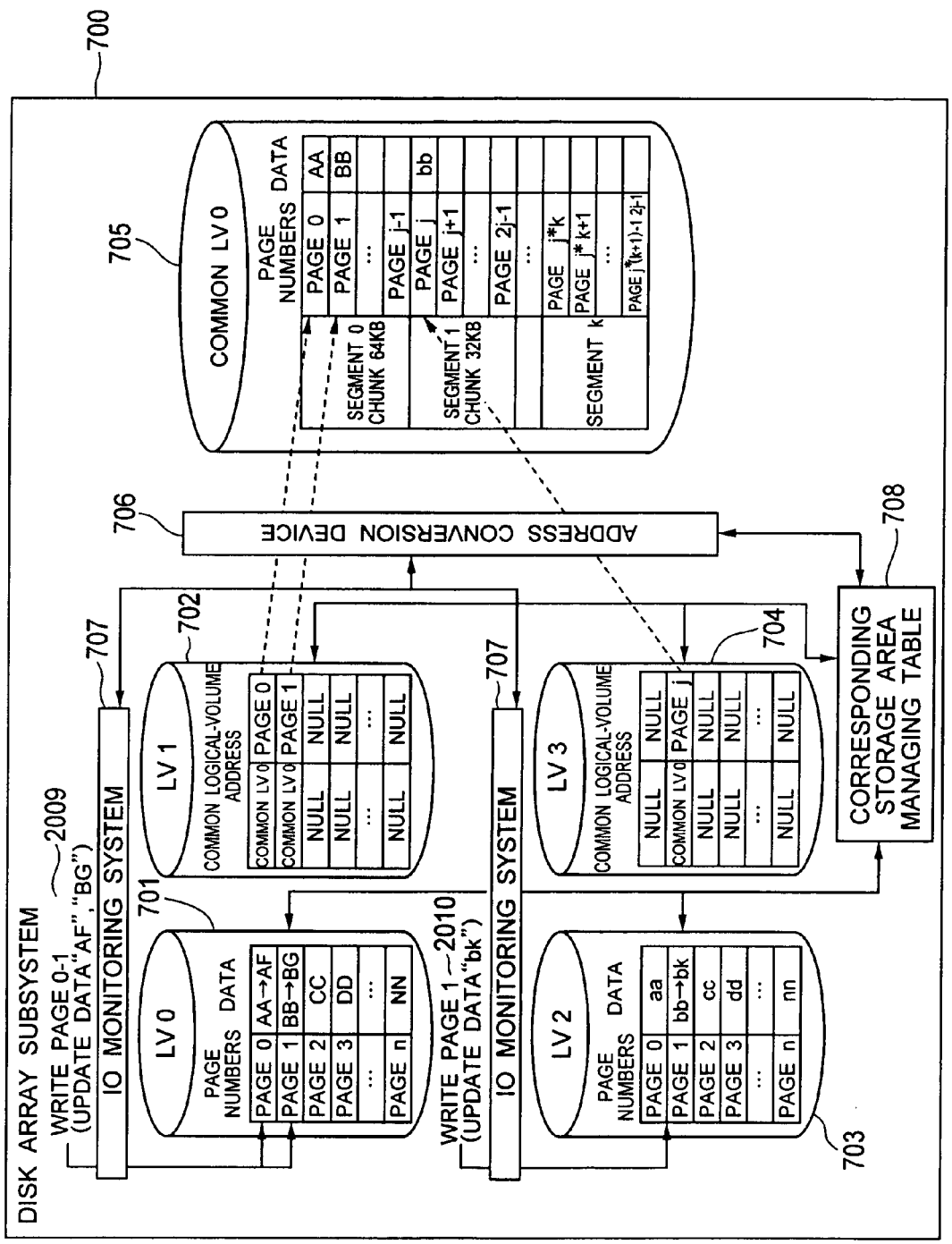
FIG. 27 is a conceptual figure for showing the state of the disk array subsystem of the embodiment after writing is performed to the snapshot duplicate volume (Second Embodiment)

Next, provided that a write-command (2010 in FIG. 27) for the second snapshot-target volume LV2 is received, the chunk size of "bk" is determined as one page after going through the same processing as that of the write-command for the first snapshot-target volume LV0, and the unused segment 1 in the common logical-volume chunk managing table (1703 in FIG. 28) is set to be 32 KB. Then, after copying the data of the page 1 of the second snapshot-target volume LV2 to the segment 1 of the common logical-volume LV0, the data received by the above-described write-command is written to the page 1 of the second snapshot-target volume LV2. The state after executing the above-described two write-commands (2009 in FIG. 27 and 2010 in FIG. 27) is shown in FIG. 27 and FIG. 28.

As described, the CPU 1004 functioning as the data storage area managing device divides the common logical-volume into units called the segments according to the IO size required by the host and sets the chunk size by each segment. Thus, it is possible to store the data to the corresponding segment without dividing the IO size requested by the host.

In this case, through indicating the presence of data by each memory unit group in which a plurality of the memory units are put together (that is, by each segment) in the common logical-volume held-data managing table 802 in addition to indicating the presence of data by each page as the memory unit, it enables to further improve the search efficiency, access speed and the like. For example, it is possible to utilize the address of the page positioned in the first segment as the address representing the segments.

Third Embodiment

Next, described is an embodiment in which a data arranging device for rearranging the data is provided in each real data storage area.

Figure 29:
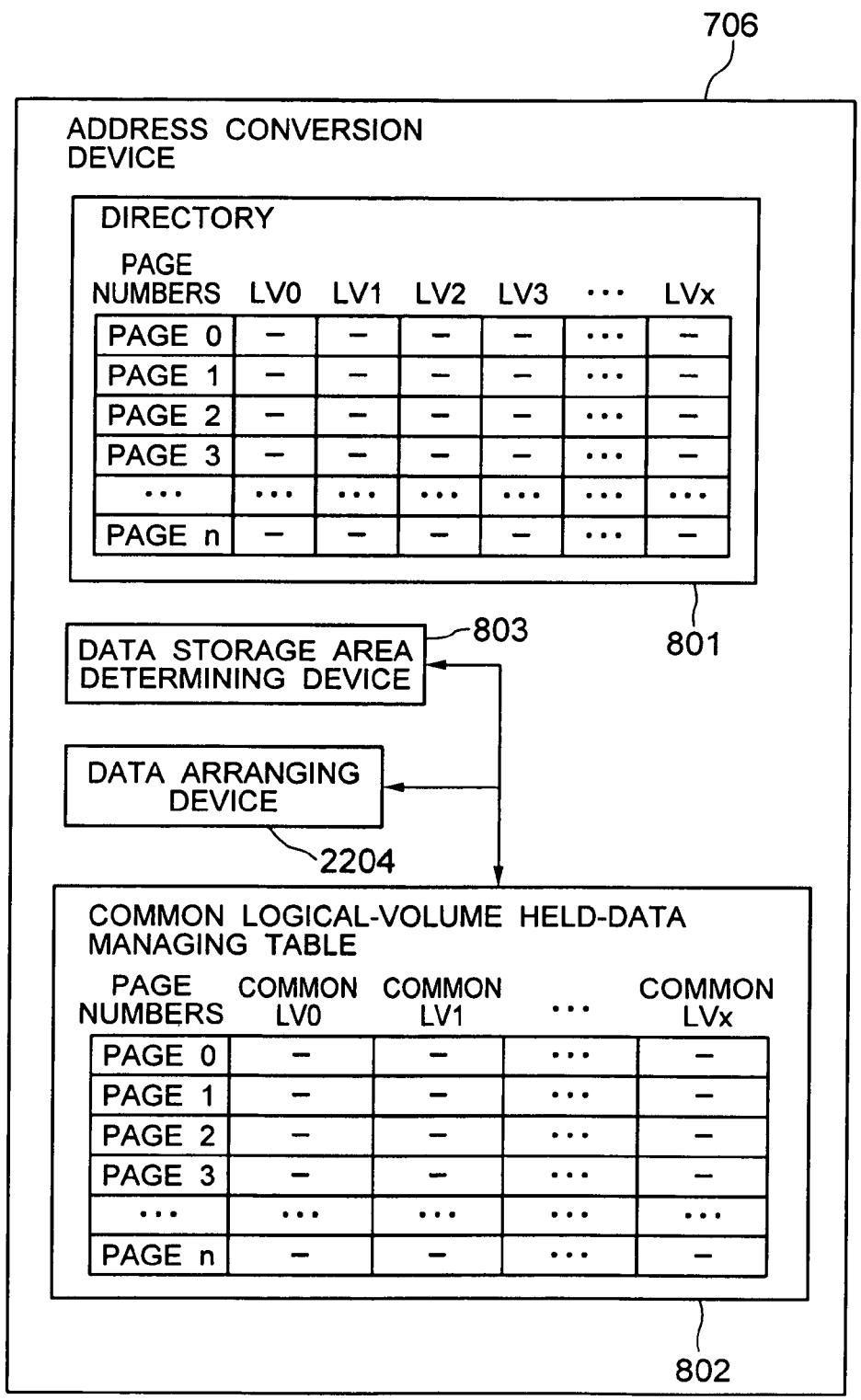
FIG. 29 is a functional block diagram for showing an address conversion device of still another embodiment to which the present invention is applied (Third Embodiment)

As shown in FIG. 29, the address conversion device 706 of the embodiment comprises a directory 801, a common logical-volume held-data managing table 802, a data storage area determining device 803, and a data arranging device 2204.

In the embodiment, writing to the snapshot duplicate volume is not performed by each memory unit peculiar to the disk array subsystem 700 but is performed by each chunk unit which is kinetically determined according to the IO size designated by the write-command.

Figure 30:
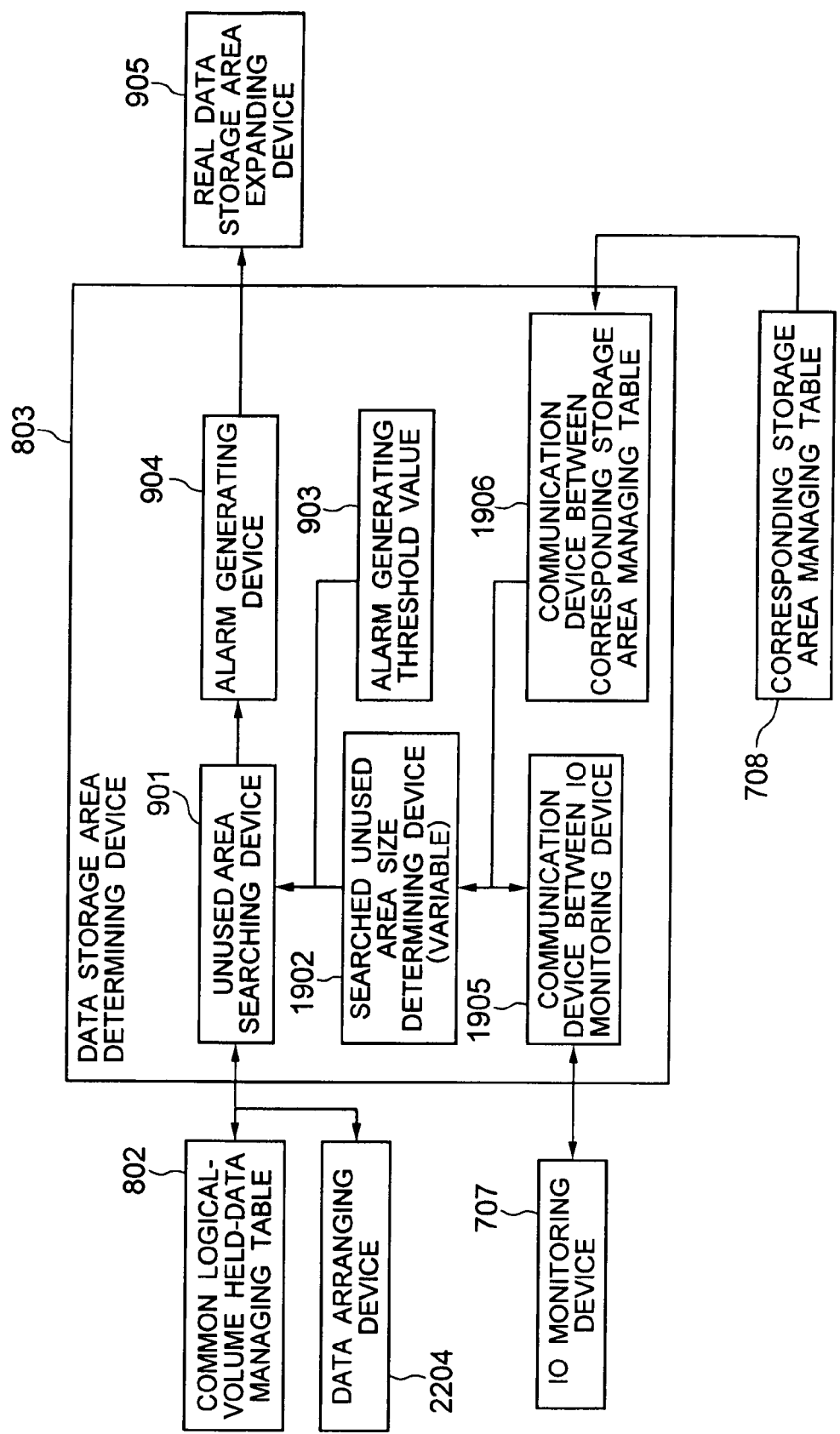
FIG. 30 is a functional block diagram for showing a data storage area determining device of the embodiment (Third Embodiment)

Upon receiving the write-command from the host, the IO monitoring device 707 informs the IO size of the command to the data storage area determining device 803 through the IO size informing device (1802 in FIG. 25). The unused area size determining device (1902 in FIG. 30) determines the chunk size from the informed IO size and the memory unit peculiar to the disk array subsystem 700, and the unused area searching device (901 in FIG. 30) refers the chunk size to the common logical-volume held-data managing table (802 in FIG. 29) and determines the common logical-volume and the page for storing the data.

When the unused areas of the common logical-volume are to be dispersed as a result of repeating the writing of data to the snapshot duplicate volume and deleting of the snapshot duplicate volume, the data arranging device (2204 in FIG. 29) rearranges the data within the common logical-volume so that the unused areas are positioned in the contiguous page addresses. The processing hereinafter is the same as the case of the first embodiment.

In the embodiment, it is so configured that the data is stored in the common logical-volume by a chunk unit which is kinetically determined by each command. Thus, the write-data designated by a single command are not to be dispersed on the common logical-volume so that deterioration in the access performance can be prevented.

Further, it is so configured that the data is rearranged so that the unused areas are positioned in the contiguous page addresses in the case where the unused areas are dispersed on the common logical-volume due to deletion of the snapshot duplicate volume and the like. Thus, it is unnecessary to prepare the segment for each chunk size and it enables to omit the common logical-volume chunk managing table. Further, it is possible to improve the use efficiency of the storage capacity.

Next, the operation of the embodiment will be described by referring to a specific example.

The preparation performed before the snapshot is the same as the case of the above-described first embodiment. Thus, only the process of storing data to the snapshot duplicate volume will be described herein.

In the embodiment, the writing size to the snapshot duplicate volume is determined kinetically according to the IO size of the write-command. In order to simplify the chunk size management, it is desirable to set the chunk size to be an integral multiple of the managing unit (page) peculiar to the disk array subsystem 700.

Figure 31:
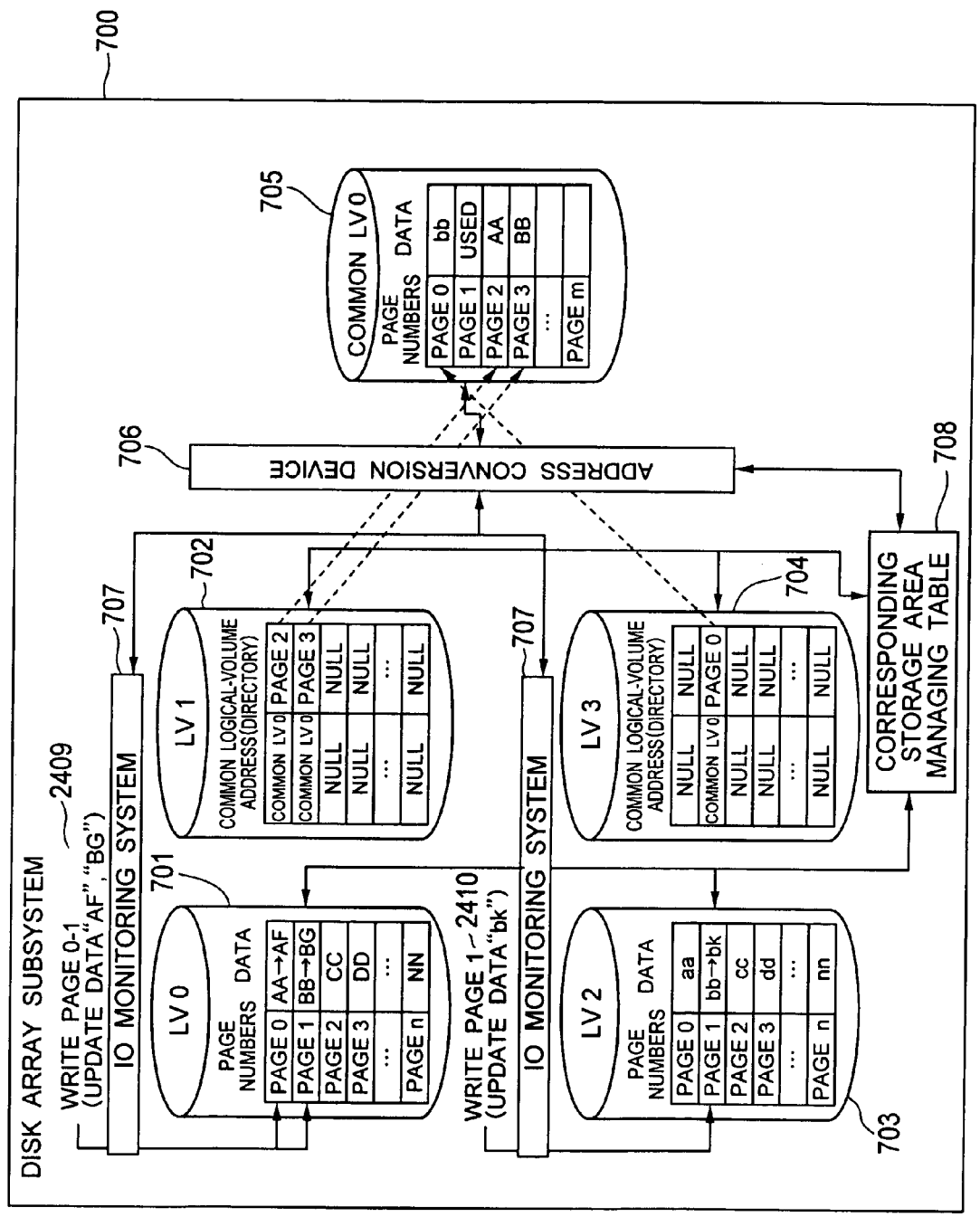
FIG. 31 is a conceptual figure for showing the state of the disk array subsystem of the embodiment after writing is performed to the snapshot duplicate volume (Third Embodiment)

Provided that a write-command (2409 in FIG. 31) for the first snapshot-target volume LV0 is received at this moment, the IO size is informed to the data storage area determining device (803 in FIG. 30) from the IO monitoring device (707 in FIG. 21), and it is determined by the unused area size determining device (1902 in FIG. 30) that the chunk size of the data "AF", "BG" is two pages (64 KB).

However, the chunk size is adjusted to be one page (32 KB) in the case where it is determined that there has been data already written in the page 0 of the snapshot duplicate volume LV1 after judging it through: recognizing that the command is the write-command for the snapshot-target volume LV0 by referring to the volume number LV0 in the logical-volume property managing table (201 in FIG. 19), converting the target of the command to the first snapshot duplicate volume LV1 by referring to the logical-volume conversion table (202 in FIG. 19), and judging whether or not writing has been performed before in the respective page of the snapshot duplicate volume LV1 by referring to the held-data managing table (203 in FIG. 19).

Next, the unused area searching device (901 in FIG. 30) determines the unused page with the chunk size or larger, which is found first when the common logical-volume is searched from the front, or the unused page which best fits to the chunk size, or the unused page determined by other algorithm as the page address of common logical-volume to be used next.

The operation hereinafter is the same as the case of the above-described first embodiment, in which the data "AF" is written to the page 0 of the snapshot-target volume LV0 and the data "BG" is written to the page 1 after copying the data of the page 0 and the page 1 of the snapshot-target volume LV0 to the page 2 and page 3 having the contiguous vacant area with 64 KB or larger in the common logical-volume LV0.

Next, provided that a write-command (2410 in FIG. 31) for the second snapshot-target volume LV2 is received, the chunk size of "bk" is determined as one page (32 KB) after going through the same processing as that of the write-command for the first snapshot-target volume LV0. After the unused area searching device (901 in FIG. 30) copies the data of the page 1 of the snapshot-target volume LV2 to the vacant area of 32 KB which is searched first from the common logical-volume LV0 (that is, the page 0 of the common logical-volume LV0), the data "bk" is written to the page 1 of the snapshot-target volume LV2.

Next, the data arranging procedure 2204 will be described. When forming the snapshot duplicate volume, writing to the snapshot duplicate volume, and deletion of the snapshot duplicate volume are repeatedly executed, unused pages in various sizes are to be dispersedly positioned on the common logical-volume LV0, since the writing size to the snapshot duplicate volume is kinetically determined according to the IO size of the write-command. Thus, it is possible that writing to the snapshot duplicate volume cannot be achieved in some of the cases since all of the chunk sizes are unsatisfied for the chunk size even though there are a large amount of unused pages all together.

Figure 32:
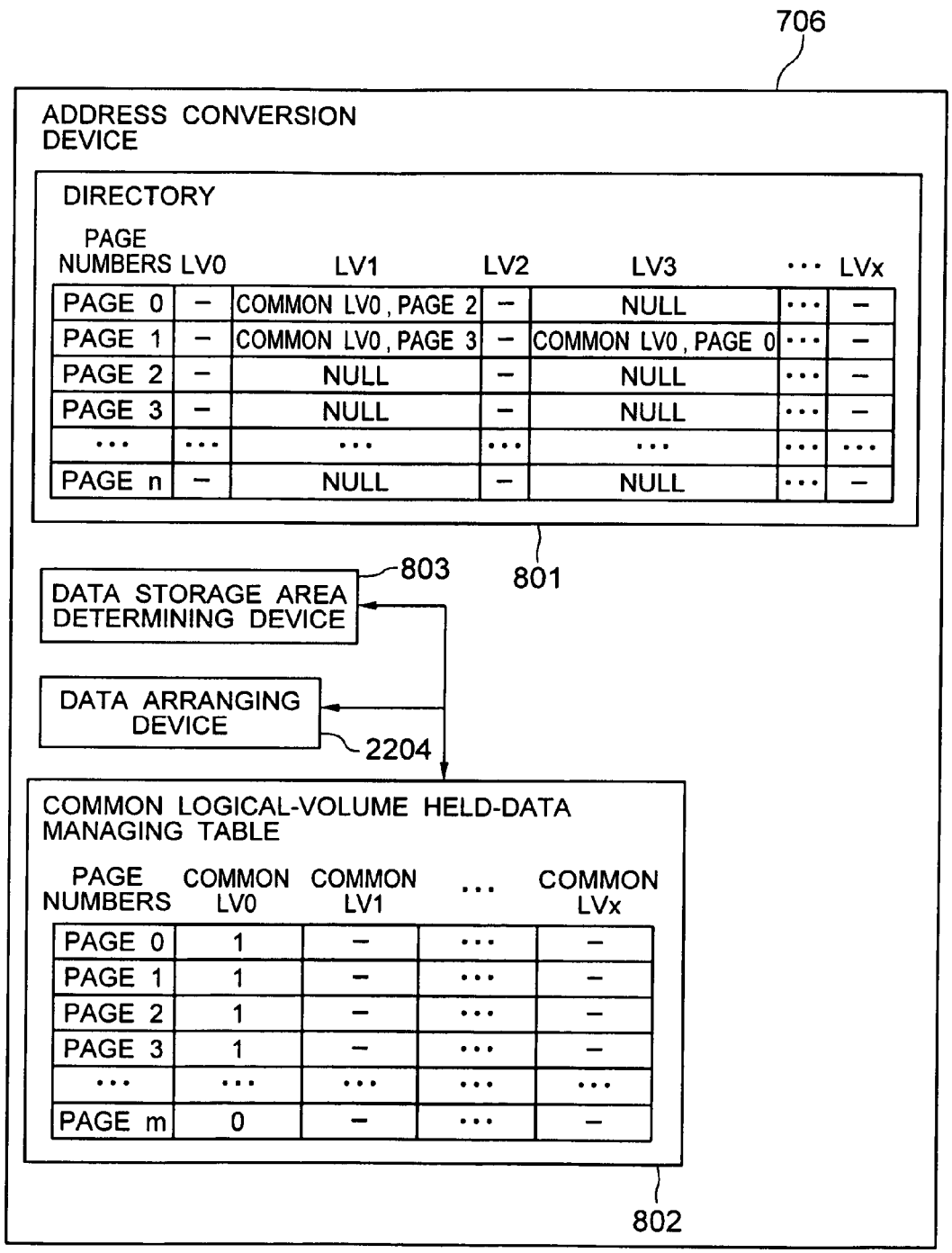
FIG. 32 is a conceptual figure for showing the state of the address conversion device of the embodiment after writing is performed to the snapshot duplicate volume (Third Embodiment)

The data arranging device (2204 in FIG. 32) periodically searches the common logical-volume held-data managing table (802 in FIG. 32) and relocates the pages so that the unused pages are not to be dispersed in the common logical-volume. After relocating the page, 0 is set to the page before the relocation in the common logical-volume held-data managing table (802 in FIG. 32) and 1 is set in the page after the relocation. The respective section of the directory (801 in FIG. 32) is rewritten to the page address which indicates the data on the common logical-volume after the relocation.

Now, an example of the processing operation of the data arranging device 2204 will be described specifically by referring to FIG. 33 to FIG. 36.

Figure 33:
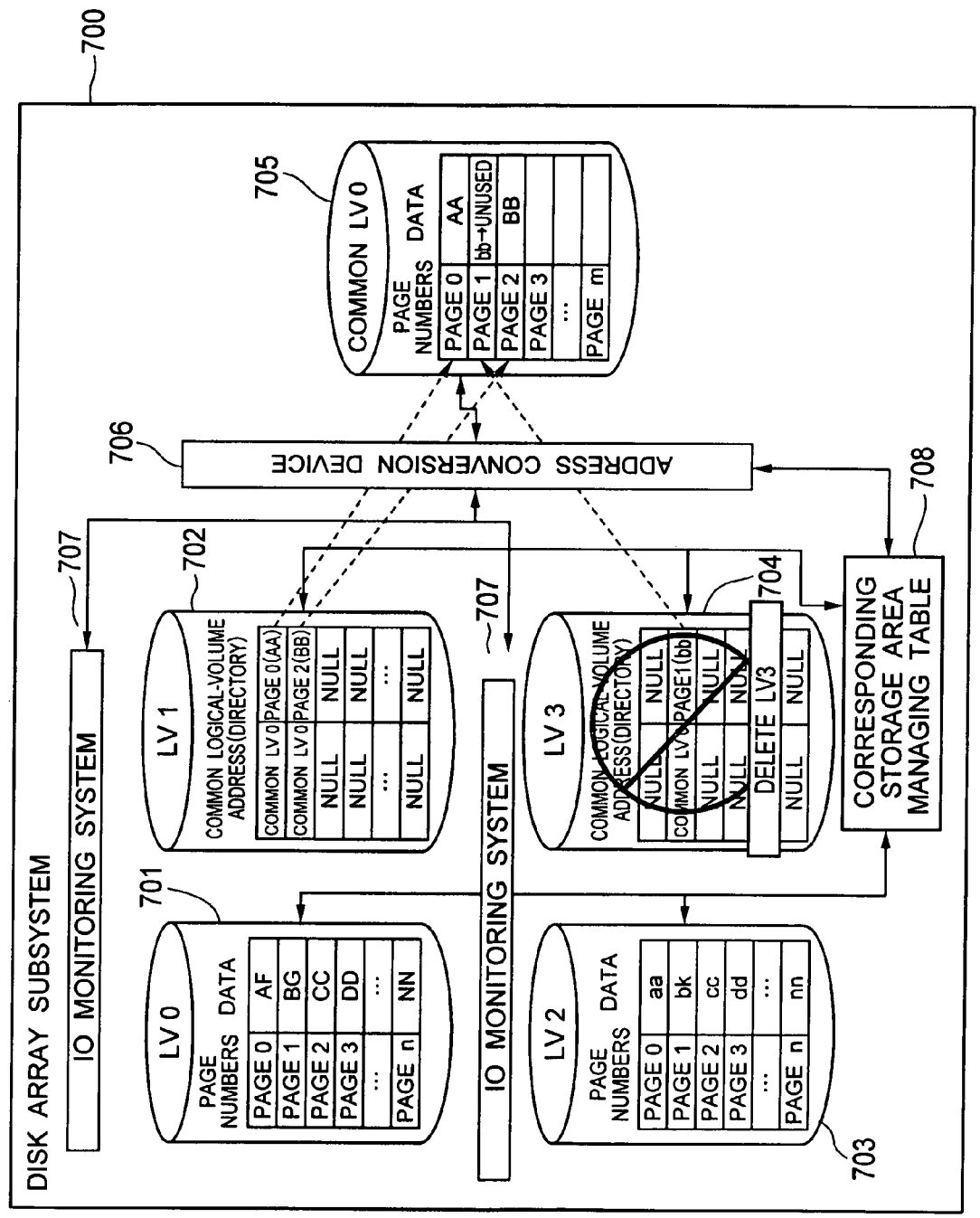
FIG. 33 is a conceptual figure for showing the state of the disk array subsystem at the time when there is an unused storage area generated in the common logical-volume (Third Embodiment)

FIG. 33 is a conceptual figure for showing the state of the disk array subsystem before and after deleting the snapshot duplicate volume 704 which is the snapshot of the snapshot-target volume 703.

In the embodiment, as has been described, the data to be stored in the snapshot duplicate volume 704 functioning as the duplicate data storage area is stored in the common logical-volume 705 as the real data storage area at last. Thus, deletion of the snapshot duplicate volume 704 means deletion of the corresponding data in the common logical-volume 705 in which the data of the volume 704 is actually stored.

Figure 34:
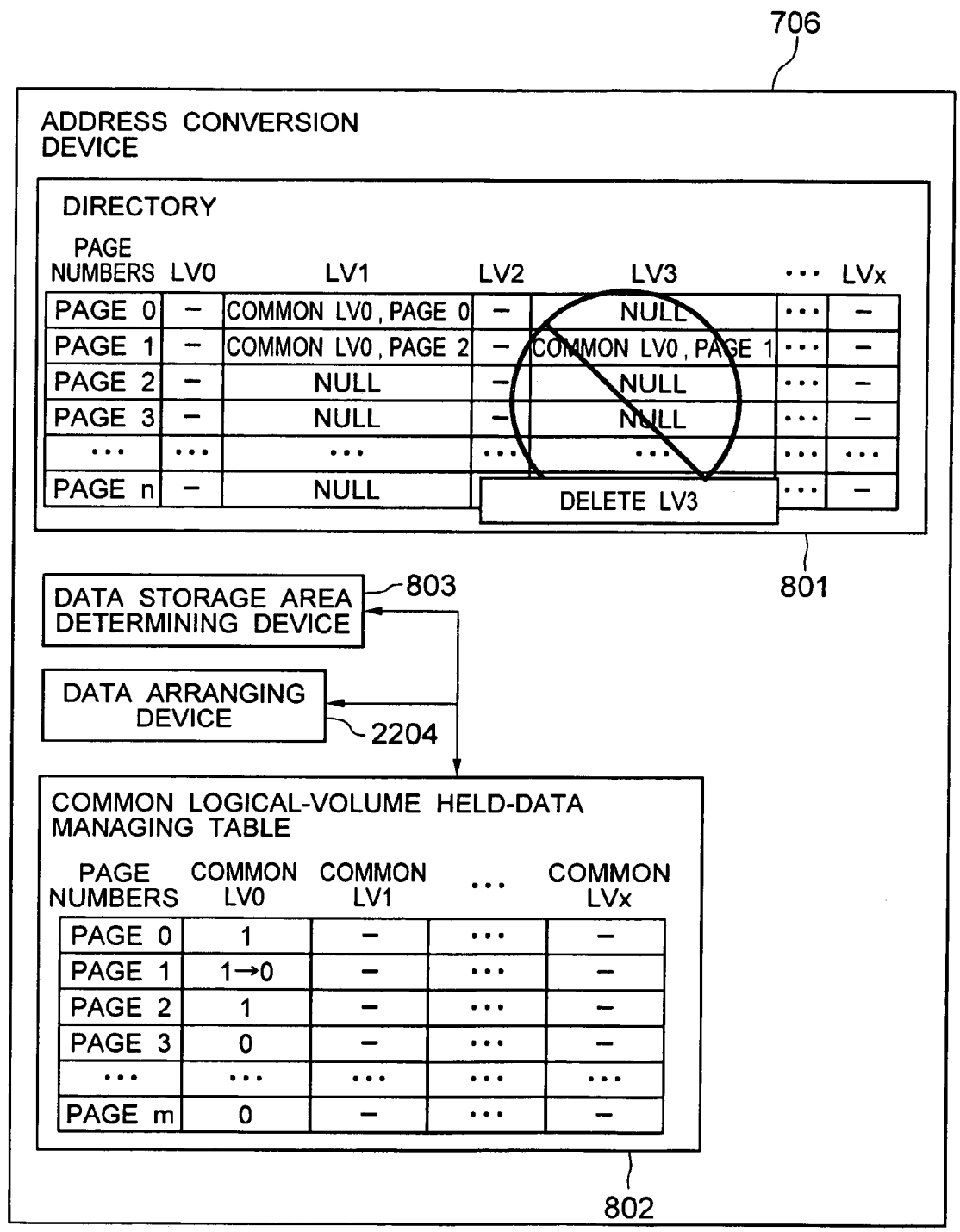
FIG. 34 is a conceptual figure for showing the state of a directory at the time when there is the unused storage area generated in the common logical-volume (Third Embodiment)

In this case, as shown in the directory 801 of FIG. 34, the data to be stored in the page 1 of the snapshot duplicate volume 704 having the volume number LV3 is stored in the page 1 of the common logical-volume 705 having the volume number LV0. Thus, when there is a deletion command for the snapshot duplicate volume 704, the CPU 1004 refers to the directory 801 of FIG. 34 and deletes the data "bb" of the page 1 of the common logical-volume 705, while setting the value 0, indicating that it is unused, in the section of the page 1 of the volume number LV0 which corresponds to the common logical-volume 705 in the common logical-volume held-data managing table 802 of FIG. 34.

By deleting the data "bb" of the page 1 of the common logical-volume 705 as described above, the page 1 of the common logical-volume 705 becomes an unused page.

Figure 35:
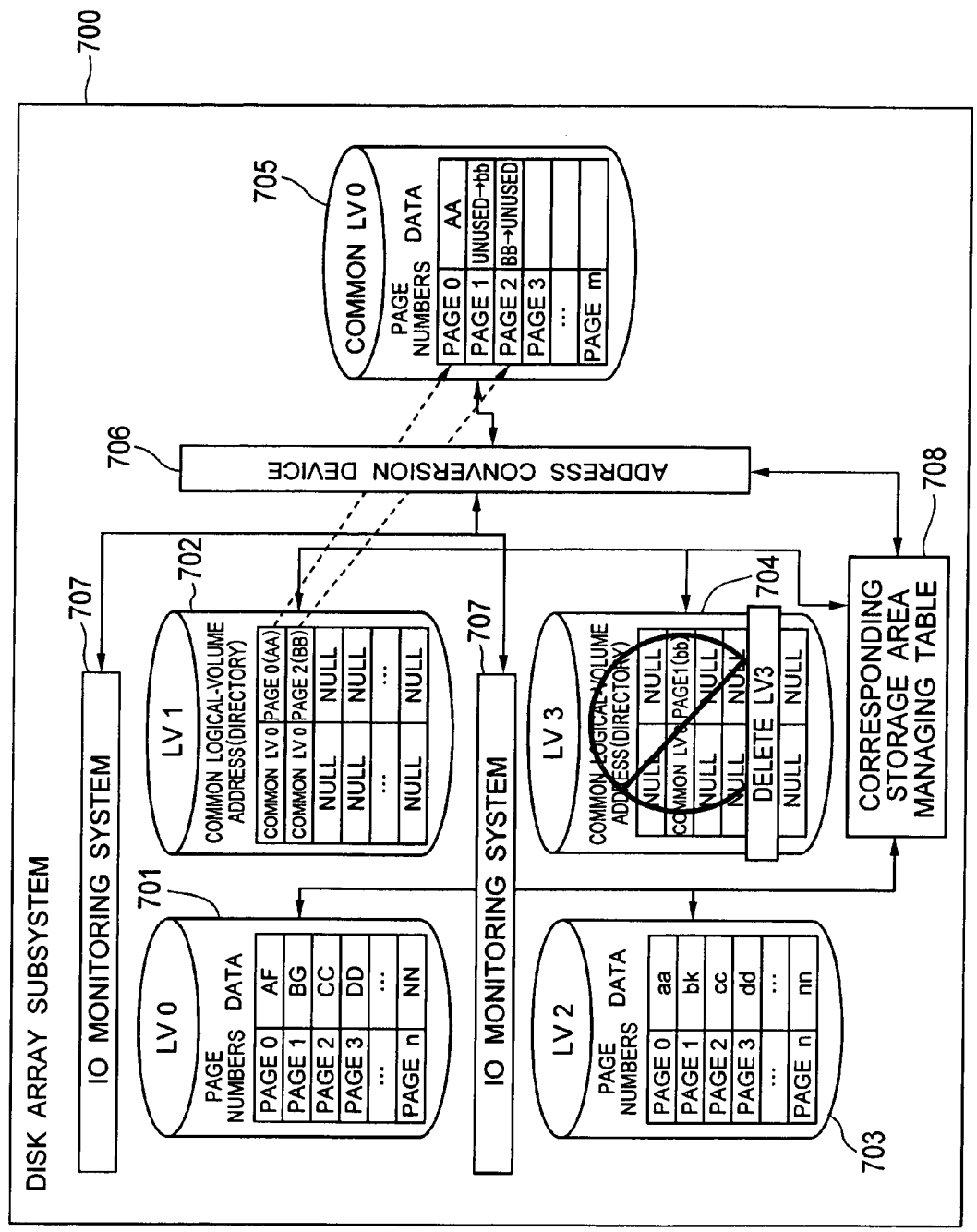
FIG. 35 is a conceptual figure for showing the state of the disk array subsystem at the time when the data of the common logical-volume are relocated so as to fill the unused storage area generated in the common logical-volume (Third Embodiment)

When the data arranging device 2204 is started, the data after the page 2 of the snapshot duplicate volume 704 is shifted by one page to be relocated in the page on the front side. For example, "BB" which is the data of the page 2 of the common logical-volume 705 in FIG. 33 is relocated to the page 1 of the common logical-volume 705 in the manner as shown in FIG. 35.

Figure 36:
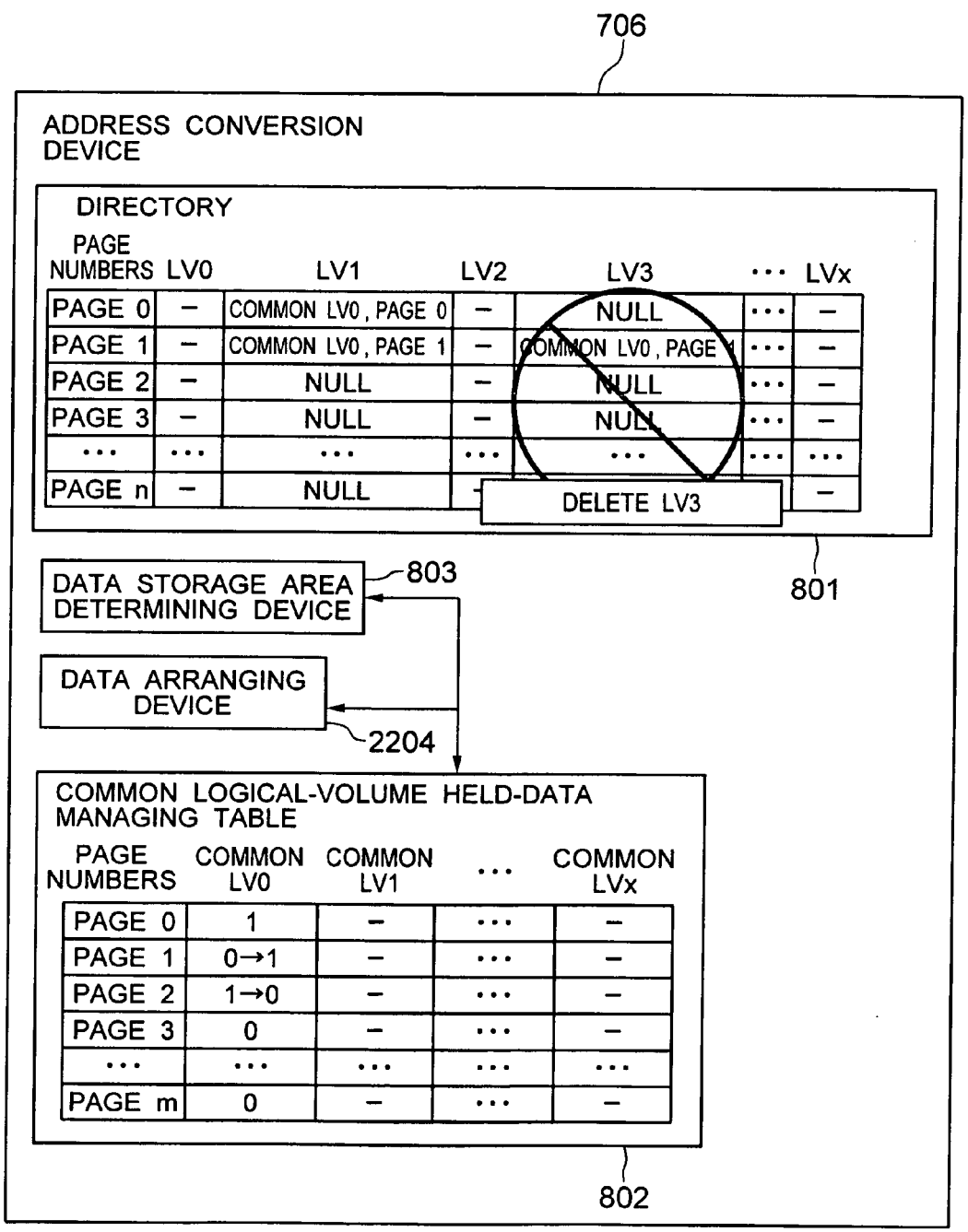
FIG. 36 is a conceptual figure for showing the state of the directory at the time when the data of the common logical-volume are relocated so as to fill the unused storage area generated in the common logical-volume (Third Embodiment)

In accordance with the execution of the relocating processing, the value 1 indicating that it is used is set anew in the section of the page 1 of the volume number LV0 corresponding to the common logical-volume 705 in the common logical-volume held-data managing table 802 shown in FIG. 36, and also the storage area corresponding to the data which is relocated in the common logical-volume 705 is updated and rewritten as shown in the directory 801 of FIG. 36.

In this case, the data of the page 2 of the common logical-volume 705 shown in FIG. 33 (that is, the data of the page 1 of the snapshot duplicate volume 702 which corresponds to the volume number LV1 in the directory 801 shown in FIG. 34) is shifted from the front by one page within the common logical-volume 705. Therefore, in the directory 801 of FIG. 36, the storage area of the data of the page 1 of the volume number LV1 which corresponds to the snapshot duplicate volume 702 is rewritten from "the volume number LV0, page 2" of FIG. 34 to "the volume number LV0, page 1" of FIG. 36.

The value 0 for indicating that it is unused is set in the section of the page 2 of the volume number LV0 which corresponds to the common logical-volume 705 in the common logical-volume held-data managing table 802 of FIG. 36 since the page 3 of the common logical-volume 705 is unused in the first place as shown in FIG. 33 and there is no data to be located in the page 2 of the volume number LV0. Thus, where the data has already been stored in the page 3 and thereafter of the common logical-volume 705, naturally, the value 1 indicating that it is being used is maintained as it is in the section of the page 2 of the volume number LV0 in the common logical-volume held-data managing table 802 of FIG. 36.

The relocating processing of the data by the data arranging device 2204 has been described above by referring to the operation of the case as the simplest example, in which the data for one page within the common logical-volume 705 as the real data storage area is deleted. However, even in the case where the data of a plurality of the pages are deleted from the common logical-volume 705, it is possible to generate a contiguous storage area by relocating all the data within the common logical-volume 705 for putting them together on the front page side and releasing the page on the rear side through repeating the relocating processing in which the pages after the vacant page are all shifted by one page regardless of the presence/non-presence of data by searching the page of the common logical-volume 705 and repeatedly executing the processing completely the same as the one described above every time the vacant page is detected.

Further, in practice, in consideration of the processing time required for relocating the data, it is possible to shift the data for the corresponding number of the vacant pages in order from the data on the front side by obtaining the number of the vacant pages located in the position closer to the front side than the respective page by each of the used pages through collectively detecting the unused pages by searching the page of the common logical-volume 705 from the front.

In this case, for example, if each of the page 0, page 1, page 2, page 3, page 4, page 5, — is unused, unused, used, unused, used, used—, respectively, the number of the vacant pages corresponding to the used page 2 is two pages, the number of the vacant pages corresponding to the used page 4 is three pages, and the number of the vacant pages corresponding to the used page 5 is three pages. Thus, first, the data of the used page 2 is being shifted by two pages on the superior side to be written in the page 0. Then, the data of the used page 4 is being shifted by three pages on the higher side to be written to the page 1 and, further, the data of the used page 5 is being shifted by three pages on the higher side to be written to the page 2.

The arranging processing performed by the data arranging device 2204 may be executed in the background so as not to disturb the IO processing from the host.

In the case where the arranging processing is performed in the background, the processing for detecting the dispersion of the unused pages may be executed by an arbitrarily set schedule and the arranging processing may be automatically started at the stage where the dispersion (fragmentation) of the unused pages exceeds the set limitation.

The present invention can be utilized for backup and the like of the volume level in the disk array subsystem.

What is claimed is:

1. A duplicate data storing system of a storage device for storing original data of a copy source in a duplicate data storage area in accordance with an update of the original data, the system comprising:

a real data storage area which stores data of a copy source, a copy of which is to be written as duplicate data to a duplicate data storage area which is virtually built within the storage device;

a data-storage area determining device which determines a next storage area to be used for storing said duplicate data in a contiguous arrangement in the real data storage area; and a data-storage area managing device which manages where, in the real data storage area, the duplicate data of the duplicate data storage area is stored;

a held-data managing device which manages a use state of the real data storage area; and a real data storage area expanding device which increases a storage capacity of the real data storage area, wherein a plurality of duplicate data storage areas share the real data storage area, wherein a storage capacity of the real data storage area which is physically secured in response to a snapshot command to store said data in the real data storage area corresponds to an amount of data of said copy source which is to be updated among original data of said copy source, and wherein the held-data managing device comprises:

a table which indicates the presence of data by each memory unit through dividing the storage area of the real data storage area into memory units;

a table which indicates the presence of data by each memory unit group in which a plurality of the memory units are put together; and a table with a plurality of hierarchies in which a plurality of the memory unit groups are put together to indicate the presence of data by each of the hierarchies.

2. The duplicate data storing system of a storage device according to claim 1, wherein the real data storage area expanding device is formed to increase the storage capacity of the real data storage area by expanding the real data storage area.

3. The duplicate data storing system of a storage device according to claim 1, wherein the real data storage area expanding device is formed to increase the storage capacity of the real data storage area by generating, in addition to the real data storage area, a new real data storage area within the storage device.

4. The duplicate data storing system of a storage device according to claim 1, wherein one or more of the real data storage areas are provided in the storage device and data in all the duplicate data storage areas within the storage device are stored in the one or more of the real data storage areas.

5. The duplicate data storing system of a storage device according to claim 1, wherein:
the duplicate data storage areas within the storage device is divided into a plurality of groups;
one or more of the real data storage areas are provided for each of the groups; and
a device having a list of the duplicate data storage areas and the real data storage areas belonging to the groups to is provided for each of the groups for storing the data in the duplicate data storage area within the group in the one or more of the real data storage areas within the group.

6. The duplicate data storing system of a storage device according to claim 1, further comprising an alarm generating device which generates an alarm which encourages an increase of the real data storage area when detecting that a used storage capacity of the real data storage area exceeds an alarm generating threshold value by setting an alarm generating threshold value for the real data storage area.

7. The duplicate data storing system of a storage device according to claim 1, wherein:
an alarm generating threshold value is set for the real data storage area;
an alarm which encourages an increase of the real data storage area is generated when a used storage capacity of the real data storage area exceeds the alarm generating threshold value; and the real data storage area expanding device operates upon detecting the alarm.

8. The duplicate data storing system of a storage device according to claim 1, wherein the held-data managing device comprises a table which indicates the presence of data by each memory unit through dividing the storage area of the real data storage area into memory units.

9. The duplicate data storing system of a storage device according to claim 1, wherein the data storage area managing device maps the storage area of the real data storage area onto the duplicate data storage area.

10. The duplicate data storing system of a storage device according to claim 9, wherein the data storage area managing device includes a table which maps the storage area of the real data storage area onto the duplicate data storage area and obtains address conversion information for the real data storage area from an entry of the table.

11. The duplicate data storing system of a storage device according to claim 1, wherein the data storage area managing device maps the storage area of the duplicate data storage area onto the real data storage area.

12. The duplicate data storing system of a storage device according to claim 11, wherein the data storage area managing device includes a table which maps the storage area of the duplicate data storage area onto the real data storage area side and obtains address conversion information for the real data storage area from an entry of the table.

13. The duplicate data storing system of a storage device according to claim 1, further comprising a memory unit managing device which manages memory units set in the real data storage area,
wherein the data storage area determining device comprises:
a communication device which communicates with a corresponding storage area managing table which obtains a data section held by the duplicate data storage area;
a communication device which communicates with an IO monitoring device which obtains an IO size of a read-command or write-command for the duplicate data storage area; and
an unused area searching device which detects an available memory unit in the real data storage area through searching the held-data managing device.

14. The duplicate data storing system of a storage device according to claim 13, wherein the unused area searching device is formed to detect an available storage area by selecting the real data storage area according to an IO size of a command for the duplicate data storage area.

15. The duplicate data storing system of a storage device according to claim 13, wherein the memory unit managing device is formed to manage the memory units set in each of the real data storage areas.

16. The duplicate data storing system of a storage device according to claim 13, wherein the memory unit managing device is formed to manage the memory units set in each area which is obtained by dividing the real data storage areas.

17. The duplicate data storing system of a storage device according to claim 1, comprising a data arranging device which rearranges data by each of the real data storage areas.

18. The duplicate data storing system of a storage device according to claim 17, wherein the data arranging device is formed to rearrange data when it is detected that data sections held in the real data storage areas are non-contiguous.

19. The duplicate data storing system of a storage device according to claim 1, further comprising:
wherein said data in said duplicate data storage area and said data in said real data storage area are managed in an update data unit.

20. A duplicate data storing method of a storage device comprising a real data storage area for storing data of a copy source to be written to a duplicate data storage area which is virtually built within the storage device, the method comprising:
determining a next storage area to be used in a contiguous arrangement within the real data storage area;
managing a correlation which indicates where, in the real data storage area, the data of the duplicate data storage area is stored through storing the correlation within the storage device;
managing a use state of the real data storage area with a held-data managing device; and
increasing a storage capacity of the real data storage area with a real data storage area expanding device,
wherein a plurality of duplicate data storage areas share the real data storage area, and
wherein a storage capacity of the real data storage area which is physically secured in response to a snapshot command to store said data in the real data storage area corresponds to an amount of data of said copy source which is to be updated among original data of said copy source, and wherein the managing a use state with the held-data managing device comprises:

indicating, with a table, the presence of data by each memory unit through dividing the storage area of the real data storage area into memory units;

indicating, with a table, the presence of data by each memory unit group in which a plurality of the memory units are put together; and using a table with a plurality of hierarchies in which a plurality of the memory unit groups are put together to indicate the presence of data by each of the hierarchies.

21. The duplicate data storing method of a storage device according to claim 20, wherein a storage capacity of the real data storage area is increased when detecting that a used storage capacity exceeds a threshold value by monitoring the used storage capacity of the real data storage area.

22. The duplicate data storing method of a storage device according to claim 20, wherein data are rearranged within the real data storage area by detecting that data sections held in the real data storage areas are non-contiguous.

23. The duplicate data storing method of a storage device according to claim 20, further comprising:

wherein said data in said duplicate data storage area and said data in said real data storage area are managed in an update data unit.

24. A computer-readable medium having stored thereon a duplicate data storing program for storing data of a copy source to be written to a duplicate data storage area which is virtually built within a storage device in a real data storage area within the storage device, said program containing instructions for causing a microprocessor to function as:

a data storage area determining device which determines a next storage area to be used in a contiguous arrangement in the real data storage area so as to store the data in the real data storage area; and a data storage area managing device which manages where, in the real data storage area, the data of the duplicate data storage area is stored;

a held-data managing device which manages a use state of the real data storage area; and a real data storage area expanding device which increases a storage capacity of the real data storage area, wherein a plurality of duplicate data storage areas share the real data storage area, and wherein a storage capacity of the real data storage area which is physically secured in response to a snapshot command to store said data in the real data storage area corresponds to an amount of data of said copy source which is to be updated among original data of said copy source, and wherein the held-data managing device comprises:

a table which indicates the presence of data by each memory unit through dividing the storage area of the real data storage area into memory units;

a table which indicates the presence of data by each memory unit group in which a plurality of the memory units are put together; and a table with a plurality of hierarchies in which a plurality of the memory unit groups are put together to indicate the presence of data by each of the hierarchies.

25. The computer-readable medium according to claim 24, wherein the real data storage area expanding device which increases a storage capacity of the real data storage area when detecting that a used storage capacity exceeds a threshold value by monitoring the used storage capacity of the real data storage area.

26. The computer-readable medium according to claim 24, wherein the program further comprises instructions for causing the microprocessor to function as a data arranging device which rearranges data within the real data storage area by detecting that data sections held in the real data storage area are non-contiguous.

27. The computer-readable medium according to claim 24, wherein the program further comprises instructions for causing the microprocessor to function as an update data unit which manages said data in said duplicate data storage area and said data in said real data storage area are managed.

* * * * *